(12) United States Patent
Venkatesh et al.

(10) Patent No.: US 11,675,998 B2
(45) Date of Patent: Jun. 13, 2023

(54) SYSTEM AND METHOD FOR PERFORMING SMALL CHANNEL COUNT CONVOLUTIONS IN ENERGY-EFFICIENT INPUT OPERAND STATIONARY ACCELERATOR

(71) Applicant: Meta Platforms Technologies, LLC, Menlo Park, CA (US)

(72) Inventors: Ganesh Venkatesh, San Jose, CA (US); Liangzhen Lai, Fremont, CA (US); Pierce I-Jen Chuang, Sunnyvale, CA (US); Meng Li, Union City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 769 days.

(21) Appl. No.: 16/511,544

(22) Filed: Jul. 15, 2019

(65) Prior Publication Data
US 2021/0019591 A1    Jan. 21, 2021

(51) Int. Cl.
*G06N 3/04*          (2023.01)
*G06N 3/063*       (2023.01)

(52) U.S. Cl.
CPC ............... *G06N 3/04* (2013.01); *G06N 3/063* (2013.01)

(58) Field of Classification Search
CPC combination set(s) only.
See application file for complete search history.

(56) References Cited

U.S. PATENT DOCUMENTS

| 2018/0246855 | A1* | 8/2018 | Redfern | ............... G06F 3/0613 |
| 2019/0026249 | A1 | 1/2019 | Talpes et al. | |
| 2019/0080232 | A1 | 3/2019 | Choi | |
| 2020/0160226 | A1* | 5/2020 | Ross | ..................... G06N 3/063 |

OTHER PUBLICATIONS

Song et al., HyPar: Towards Hybrid Parallelism for Deep Learning Accelerator Array (Jan. 7, 2019) (Year: 2019).*
FlexFlow: A Flexible Dataflow Accelerator Architecture for Convolutional Neural Networks (2017) (Year: 2017).*
FPGA-Based Accelerators of Deep Learning Networks for Learning and Classification: A Review (Dec. 28, 2018) (Year: 2018).*
Chen et al., Eyeriss: An Energy-Efficient Reconfigurable Accelerator for Deep Convolutional Neural Networks (Jan. 31-Feb. 4, 2016) (Year: 2016).*

(Continued)

*Primary Examiner* — Luis A Sitiriche
(74) *Attorney, Agent, or Firm* — Foley & Lardner LLP

(57) ABSTRACT

Disclosed herein includes a system, a method, and a device for receiving input data to generate a plurality of outputs for a layer of a neural network. The plurality of outputs are arranged in a first array. Dimensions of the first array may be compared with dimensions of a processing unit (PE) array including a plurality of PEs. According to a result of the comparing, the first array is partitioned into subarrays by the processor. Each of the subarrays has dimensions less than or equal to the dimensions of the PE array. A first group of PEs in the PE array is assigned to a first one of the subarrays. A corresponding output of the plurality of outputs is generated using a portion of the input data by each PE of the first group of PEs assigned to the first one of the subarrays.

18 Claims, 13 Drawing Sheets

(56) References Cited

OTHER PUBLICATIONS

Park et al., Toward Optimal FPGA Implementation of Deep Convolutional Neural Networks for Handwritten Hangul Character Recognition (Mar. 2018) (Year: 2018).*
Chen Yu-Hsin et al: "Eyeriss: An Energy-Efficient Reconfigurable Accelerator for Deep Convolutional Neural Networks", IEEE Journal of Solid-State Circuits, IEEE, USA, vol. 52, No. 1, Nov. 8, 2016 (Nov. 8, 2016), pp. 127-138.
International Search Report and Written Opinion of PCT/US2020/041449 dated Oct. 22, 2020.
Sparsh Mittal: "A survey of FPGA-based accelerators for convolutional neural networks", Neural Computing and Applications, vol. 32, No. 4, Oct. 6, 2018 (Oct. 6, 2018), pp. 1109-1139.

* cited by examiner

SYSTEM AND METHOD FOR PERFORMING SMALL CHANNEL COUNT CONVOLUTIONS IN ENERGY-EFFICIENT INPUT OPERAND STATIONARY ACCELERATOR

FIELD OF DISCLOSURE

The present disclosure is generally related to a system and method for generating outputs for a layer of neural network, including but not limited to a system and method for generating outputs by partitioning an array of the outputs into subarrays and assigning processing elements to one of the subarrays.

BACKGROUND

One challenge in artificial intelligence (AI) accelerators relates to controlling or reducing power consumption in performing AI processing for a neural network. For example, the neural network may be a convolutional neural network which can include convolution layers. In a convolution layer, an AI accelerator can apply a convolution operation to an input layer, passing the result to the next layer in a manner that reduces the number of parameters compared to conventional fully connected feedforward neural network. However, as more and more complex multi-dimensional (e.g., multiple channels) input/output structures are used in a convolutional neural network, ways to reduce energy and latency may be desired. Moreover, in view of the extent of processing in performing a convolution operation with input data and kernels, avoidance of redundant operations may be desired.

SUMMARY

Various embodiments disclosed herein are related to a device for generating a plurality of outputs for a layer of neural network. In some embodiments, the device may include a processor and a processing unit (PE) array. The PE array may include a plurality of PEs. The processor may be configured to receive input data to generate a plurality of outputs for a layer of a neural network, the plurality of outputs being arranged in a first array. The processor may be configured to compare dimensions of the first array with dimensions of the PE array. The processor may be configured to partition, according to a result of the comparing, the first array into subarrays each having dimensions less than or equal to the dimensions of the PE array. The processor may be configured to assign a first group of PEs in the PE array, to a first one of the subarrays. Each PE of the first group of PEs assigned to the first one of the subarrays, may be configured to generate a corresponding output of the plurality of outputs using a portion of the input data.

In some embodiments, the PE array may be a two-dimensional M×N array. Each of M and N is an integer greater than 1. The processor may be configured to partition the first array into one or more of an M×N array, an M×N/2 array, an M/2×N array, or an M/2×N/2 array.

In some embodiments, the processor may be configured to determine whether a size of the first array in a first dimension is greater than a size of the PE array in the first dimension. In response to determining that the size of the first array in the first dimension is greater than the size of the PE array in the first dimension, the processor may be configured to partition the first array into the first one and a second one of the subarrays. The processor may be configured to assign the first subarray to the first group of PEs in the PE array and assign the second subarray to a second group of PEs in the PE array different from the first group of PEs.

In some embodiments, the processor may be further configured to identify a common portion of the input data to be used by both the first and second groups of PEs. The processor may be further configured to shift the common portion of the input data through at least a portion of the plurality of PEs, to the first and second groups of PEs.

In some embodiments, the processor may be further configured to identify a first portion of the input data to be used by the first group of PEs and a second portion of the input data to be used by the second group of PEs. The processor may be further configured to shift the first portion of the input data into the first group of PEs, along the first dimension. The processor may be further configured to shift the second portion of the input data into the second group of PEs, along the first dimension.

In some embodiments, the plurality of outputs may be outputs of convolution operations for the layer of a neural network.

In some embodiments, the input data may include a first plurality of input values and a second plurality of input values, Each PE of the first group of PEs may include a first buffer memory, a second buffer memory and multiplier and accumulator (MAC) circuitry. In generating the corresponding output of the plurality of outputs, each PE of the first group of PEs may be configured to receive first values of the first plurality of input values and second values of the second plurality of input values. Each PE of the first group of PEs may be configured to store the first values and the second values in the first buffer memory and the second buffer memory, respectively. Each PE of the first group of PEs may be configured to generate, via the MAC circuitry, a first dot product of the first values and the second values.

In some embodiments, each PE may be configured to store a first number of sets of values out of the plurality of first input values, in the first buffer memory. Each PE may be configured to compute, via the MAC circuitry, a dot product of (i) each of the first number of sets of values stored in the first buffer memory and (ii) the second values stored in the second buffer memory. Each PE may be configured to output the first number of computed dot products as outputs of convolution operations for the layer of the neural network.

Each PE may be configured to store a second number of sets of values out of the plurality of second input values, in the second buffer memory. Each PE may be configured to compute, via the MAC circuitry, a dot product of (i) the first values stored in the first buffer memory and (ii) each of the second number of sets of values stored in the second buffer memory. Each PE may be configured to output the second number of computed dot products as outputs of convolution operations for the layer of the neural network.

In some embodiments, the first plurality of input values may represent one of input data streams and weights for the layer of the neural network. The second plurality of input values may represent the other of input data streams and weights for the layer of the neural network.

Various embodiments disclosed herein are related to a method for generating a plurality of outputs for a layer of neural network. In some embodiments, the method includes receiving, by a processor, input data to generate a plurality of outputs for a layer of a neural network, the plurality of outputs being arranged in a first array. Dimensions of the first array may be compared with dimensions of a processing unit (PE) array comprising a plurality of PEs by the processor. According to a result of the comparing, the first array may be partitioned into subarrays by the processor. Each of the subarrays may have dimensions less than or equal to the dimensions of the PE array. A first group of PEs in the PE array may be assigned to a first one of the subarrays by the processor. A corresponding output of the plurality of outputs may be generated using a portion of the input data by each PE of the first group of PEs assigned to the first one of the subarrays.

In some embodiments, the PE array may be a two-dimensional M×N array. Each of M and N may be an integer greater than 1. In partitioning of the first array, the first array may be partitioned into one or more of an M×N array, an M×N/2 array, an M/2×N array, or an M/2×N/2 array.

In some embodiments, it may be determined whether a size of the first array in a first dimension is greater than a size of the PE array in the first dimension. In response to determining that the size of the first array in the first dimension is greater than the size of the PE array in the first dimension, the first array may be partitioned into the first one and a second one of the subarrays. The first subarray may be assigned to the first group of PEs in the PE array, and the second subarray to a second group of PEs in the PE array. Positions of the first group of PEs in a second dimension different from the first dimension may be different from positions of the second group of PEs in the second dimension.

In some embodiments, a common portion of the input data to be used by both the first and second groups of PEs may be identified. The common portion of the input data may be shifted through at least a portion of the plurality of PEs along the second dimension, to the first and second groups of PEs.

In some embodiments, a first portion of the input data to be used by the first group of PEs may be identified, and a second portion of the input data to be used by the second group of PEs may be identified. The first portion of the input data may be shifted through the first group of PEs along the first dimension. The second portion of the input data may be shifted through the second group of PEs along the first dimension.

In some embodiments, the plurality of outputs may be outputs of convolution operations for the layer of the neural network.

In some embodiments, the input data may include a first plurality of input values and a second plurality of input values. In generating the corresponding output of the plurality of outputs by each PE of the first group of PEs, first values of the first plurality of input values and second values of the second plurality of input values may be received by said each PE. The first values and the second values may be stored by each PE in a first buffer memory and a second buffer memory of said each PE, respectively. A first dot product of the first values and the second values may be generated by multiplier and accumulator (MAC) circuitry of each PE.

In some embodiments, a first number of sets of values, out of the first plurality of input values, may be stored in the first buffer memory of each PE. A dot product of (i) each of the first number of sets of values stored in the first buffer memory of each PE and (ii) the second values stored in the second buffer memory of each PE, may be computed by the MAC circuitry. The first number of computed dot products may be outputs of convolution operations for the layer of the neural network.

In some embodiments, a second number of sets of values, out of the plurality of second input values, may be stored in the second buffer memory of each PE. A dot product of (i) the first values stored in the first buffer memory of the said each PE and (ii) each of the second number of sets of values stored in the second buffer memory of each PE, may be computed by the MAC circuitry. The first dot product and the second number of computed dot products may be outputs of convolution operations for the layer of the neural network.

In some embodiments, the first plurality of input values may represent one of input data streams and weights for the layer of the neural network. The second plurality of input values may represent the other of input data streams and weights for the layer of the neural network.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 2I is a flow chart illustrating a process to generate a plurality of outputs for a layer of a neural network, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

- Section A describes an environment, system, configuration and/or other aspects useful for practicing or implementing an embodiment of the present systems, methods and devices; and
- Section B describes embodiments of devices, systems and methods for generating a plurality of outputs for a layer of neural network.

A. Environment for Artificial Intelligence Related Processing

Figure 1A:
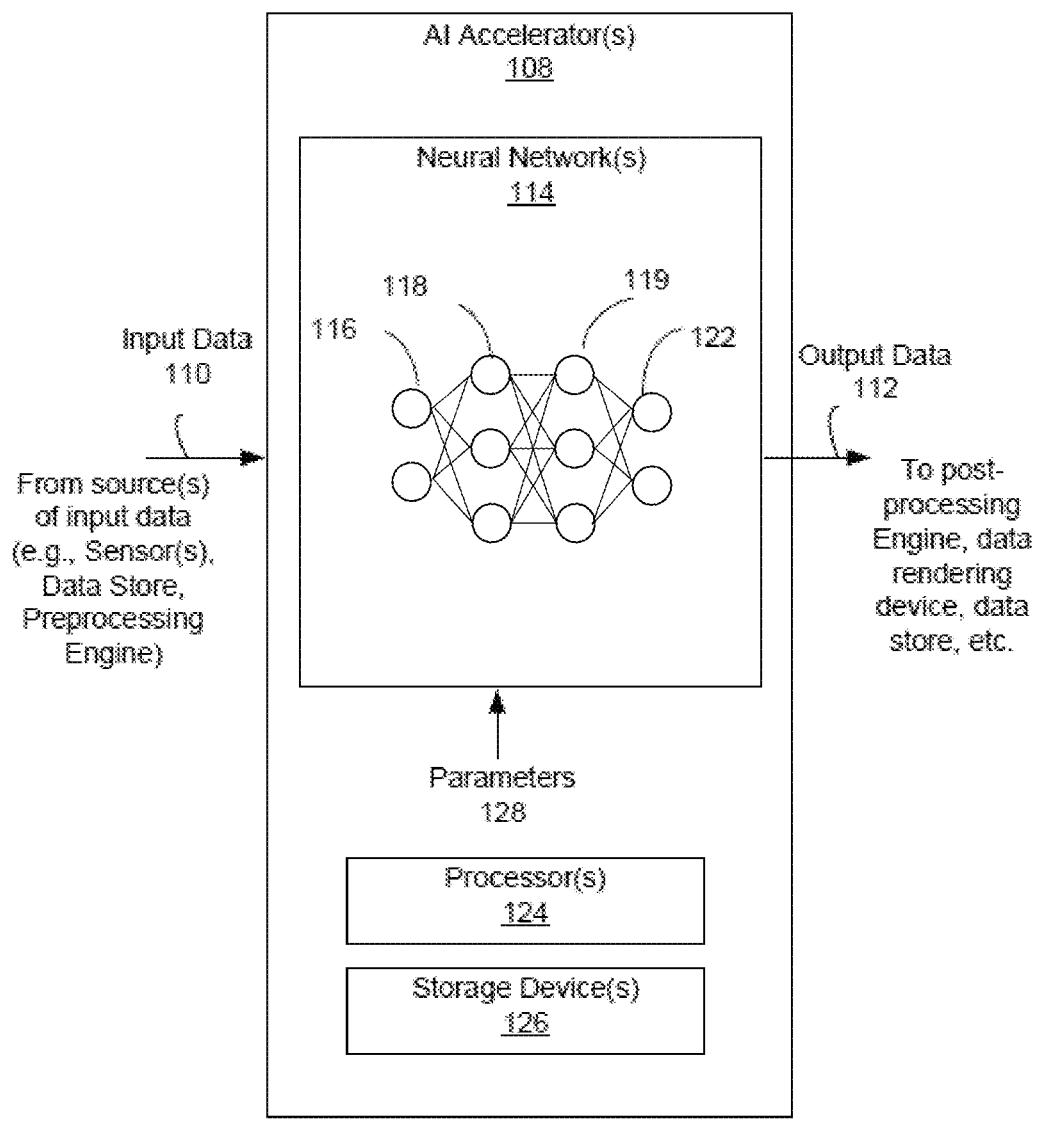
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) 24 and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 114 differently for each neural network 114, or assigning different weights (e.g., hyperparameters, or learning rates), tensor flows, etc. Thus, setting appropriate parameters 128 for the neural network(s) 114 based on a tuning or training process and the objective of the neural network(s) and/or the system, can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically, the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126.

The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
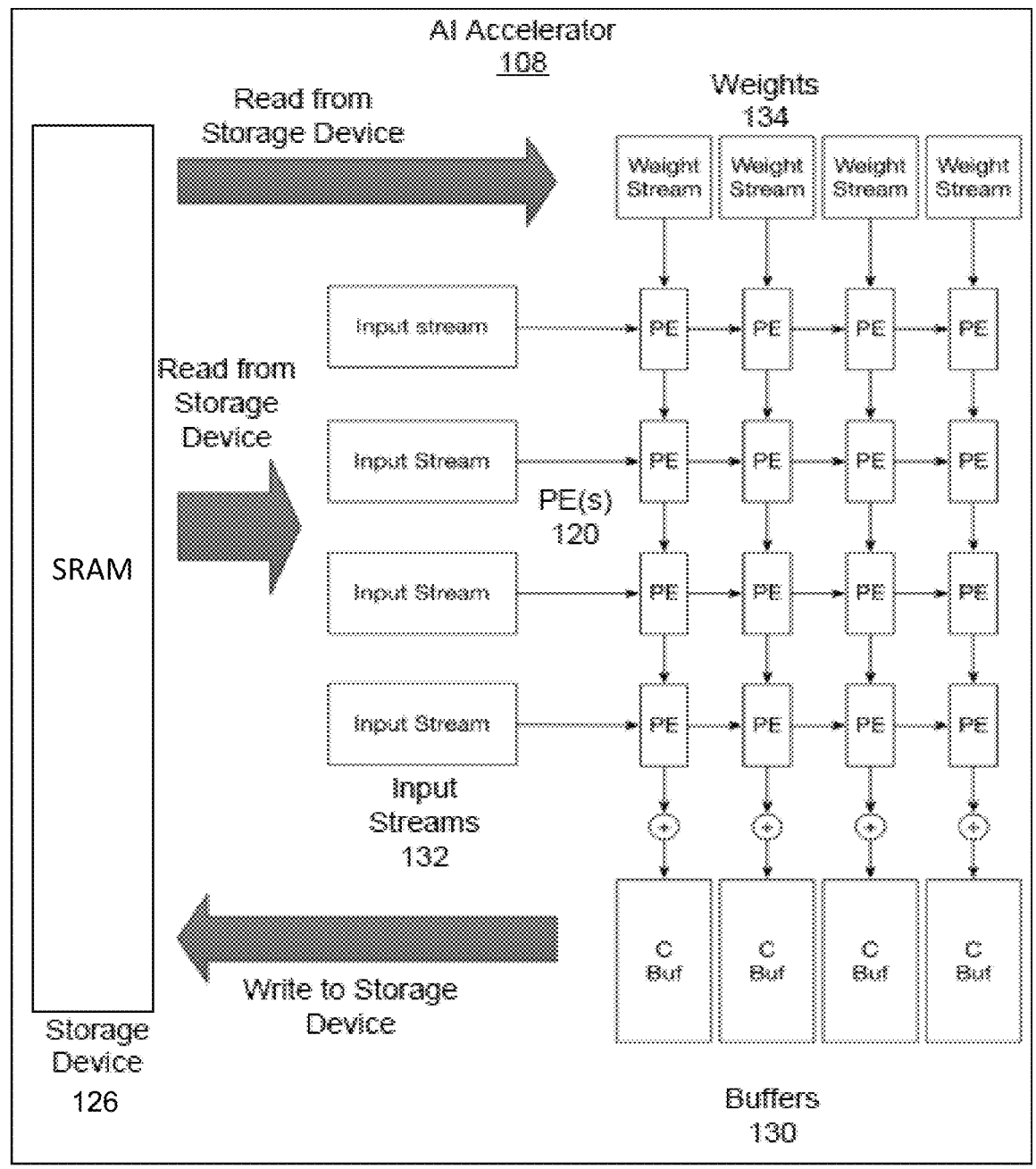
FIG. 1B is a block diagrams of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \qquad (1)$$

$$y = \sigma(\zeta) \qquad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \qquad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some neural networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can pass the result downstream for instance. The systolic array can be hardwired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored by the storage device 126 can be retrieved or read from the storage device 126, and be used as inputs to the array of PEs 120 for processing (of a subsequent layer of the neural network) at a later time. In certain embodiments, the outputs that are stored by the storage device 126 can be retrieved or read from the storage device 126 as output data 112 for the AI accelerator 108.

Figure 1C:
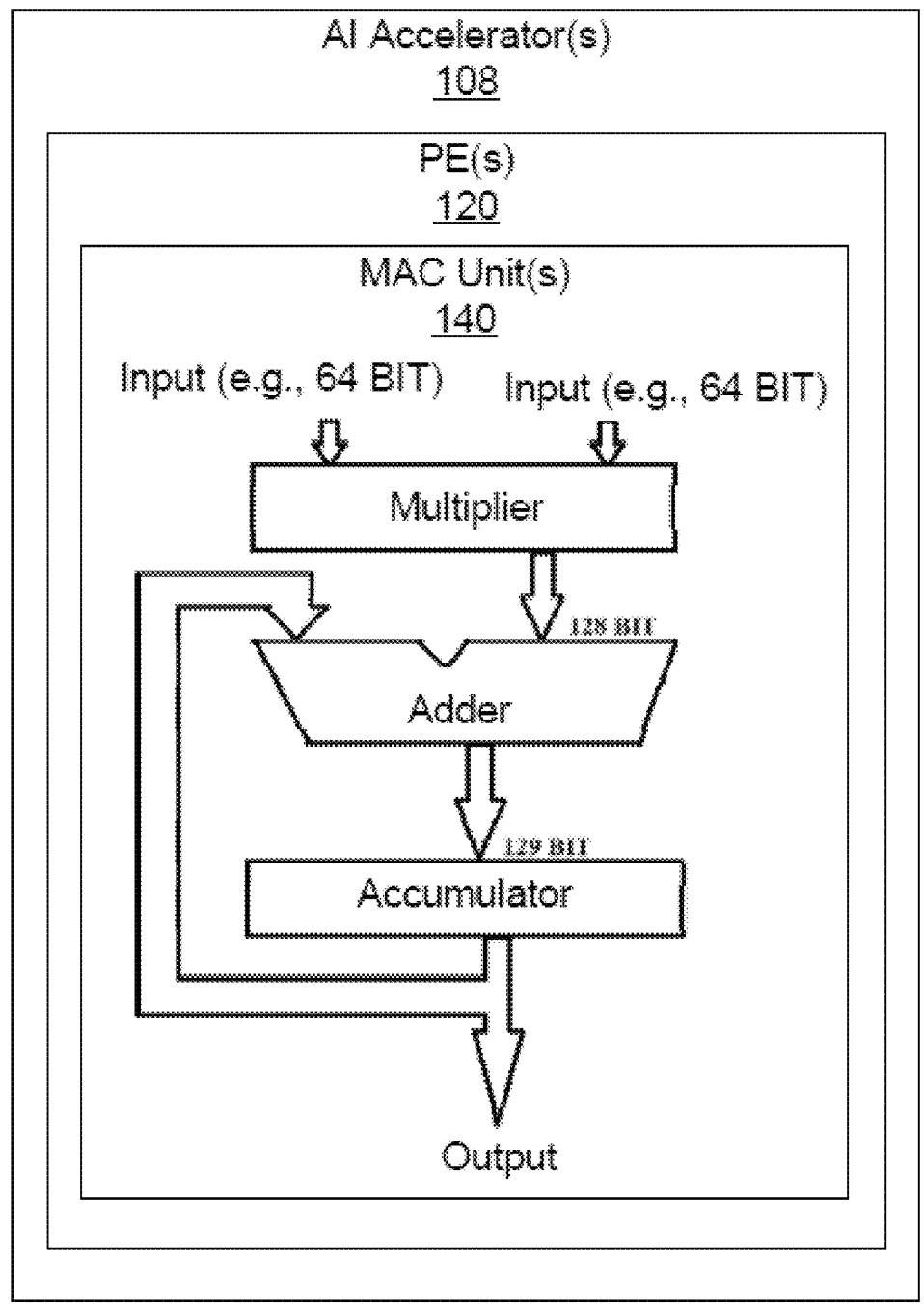
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a + (b \times c) \quad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the accumulator register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
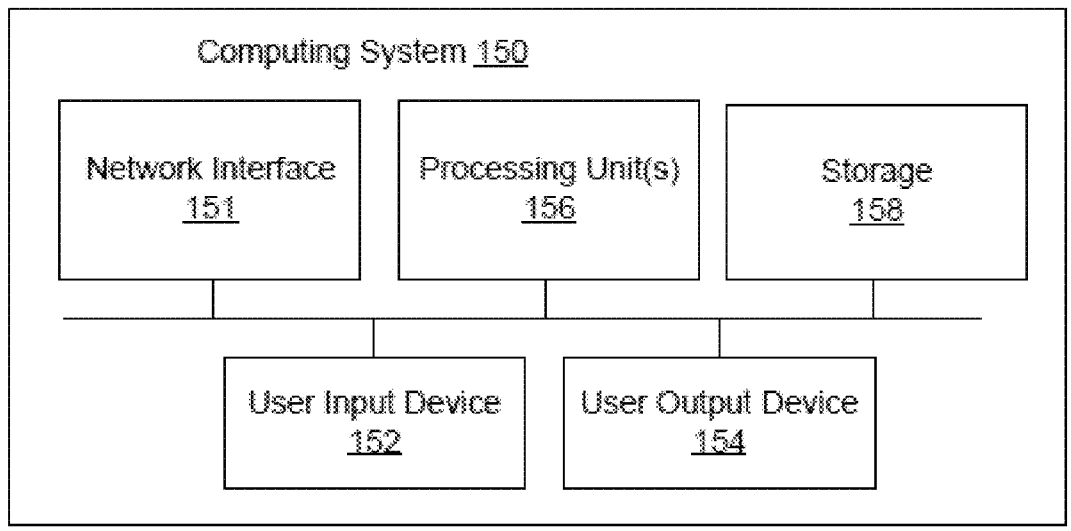
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 (or processors 156) of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. User output devices 154 can be provided in addition to or instead of a display. Examples include indicator lights, speakers, tactile "display" devices, printers, and so on.

Some implementations include electronic components, such as microprocessors, storage and memory that store computer program instructions in a non-transitory computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Methods and Devices for Generating a Plurality of Outputs for a Layer of a Neural Network Disclosed herein include embodiments of a system, a method, and a device for generating a plurality of outputs for a layer of a neural network, including but not limited to, a system and method for generating a plurality of outputs arranged in an array by partitioning the array into subarrays and assigning a group of processing elements to one of the subarrays. In some embodiments, AI accelerators are optimized for large convolutions while providing poor efficiency for smaller convolutions. To achieve high accuracy at low energy and latency, AI accelerators can be configured to be efficient at handling small convolutions while providing high throughput. Hence, instead of implementing AI accelerators optimized for large convolutions, an AI accelerator implemented in accordance with the present system, method and device is capable of providing high throughput and/or low latency, while maintaining efficiency at smaller convolutions. By way of illustration, an AI accelerator may support a general matrix multiply (GEMM) operation of a size or dimensions of AcclX×outY×AcclY (e.g., M×N×K, in GEMM terminology). The following convolution mappings can be flexibly adopted according to the input operand and/or the corresponding output:

1. Mapping convolution/GEMM operations by default: The output may be tiled into AcclX×outY blocks and may be updated using AcclX×AcclY and outY×AcclY chunks of the input operand.
2. Mapping convolution/GEMM operations with small feature count: The output may be tiled into AcclX/2× OutY/2 blocks and may be updated using AcclX/2× AcclY/2 and OutY/2×AcclY/2 chunks of the input operand.
3. Mapping convolution/GEMM operations with small input feature count: The output may be tiled into AcclX×OutY/2 blocks and may be updated using AcclX×AcclY/2 and OutY/2×AcclY/2 chunks of the input operand.
4. Mapping convolution/GEMM operations with small output feature count: The output may be tiled into AcclX/2×OutY blocks and may be updated using AcclX/2×AcclY/2 and OutY×AcclY/2 chunks of the input operand.

The various convolution mappings can enable an AI accelerator's compute throughput to be at a high level for a wide range of GEMM/Convolution dimensions, as compared to a single convolution configuration optimized for large convolutions.

In some aspects, one source of energy inefficiency when performing a convolution/GEMM operation on CNN-based AI accelerators is the repeated fetching of input operands. In some embodiments, 'r' registers or flipflops can be added in each processing element (PE) to hold stationary operand(s) that are persistent across invocations. This helps us can enable the system to avoid redundant fetches of the stationary operand(s), e.g., when the convolution/GEMM's reduction dimension is less than or equal to AcclY×r.

Similar to the above technique that avoids multiple fetching of stationary operand(s), the number of times the streaming operand is to be fetched can be reduced for the case where the GEMM is larger than AcclX but input feature count is less than AcclY×'r'. In this case, the reuse count of the streaming operand can be increased by up to 'r' times.

Figure 2A:
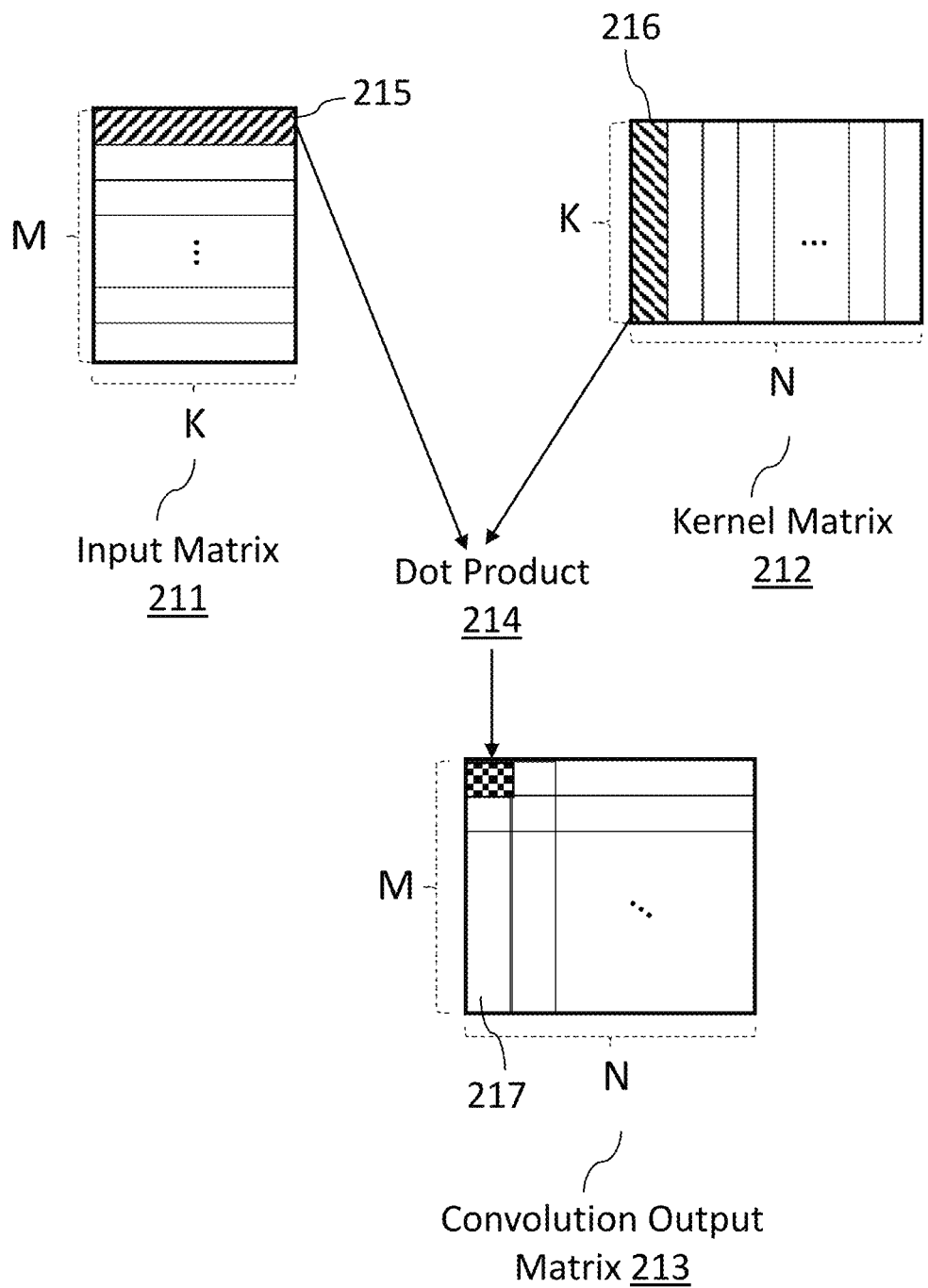
FIG. 2A includes a representation of data for performing AI related processing, according to an example implementation of the present disclosure.

FIG. 2A is a representation of data for performing AI related processing, according to an example implementation of the present disclosure. Referring to FIG. 2A, an AI accelerator (or an "accelerator") can receive an (M×K) input matrix 211 as input data and a (K×N) kernel matrix 212 as kernel information, and may perform a convolution to generate an (M×N) convolution output matrix 213 as output data. In some embodiments, the AI accelerator can generate the (M×N) convolution output matrix 213 by performing dot product operations 214 on one row from the input matrix 211 and a corresponding column from the kernel matrix 212. In some embodiments, the accelerator can generate the (M×N) convolution output matrix 213 by using a GEMM algorithm. In some embodiments, the input matrix 211 may represent input data streams (e.g., image data) divided by M data chunks with size K for a layer of a neural network. In some embodiments, the input data may be associated with a number of channels (e.g., in the case of RGB data, the number of channels is three). In some embodiments, the kernel matrix may represent N kernels each of which consists of K weights for a layer of a neural network.

In designing AI accelerators, optimization can be performed for large convolutions (e.g., convolutions with a large output size (M×N) as illustrated in FIG. 2A). In one approach, an AI accelerator can provide optimization for convolutions with data having large sizes (e.g., large data array shapes and/or dimensions) while providing poor efficiency or utilization for smaller convolutions (e.g., convolutions with an output size that is smaller than (M×N)). For example, when the number of input data chunks M and/or the number of kernels N is relatively small in an AI accelerator, a portion of the AI accelerator (e.g., circuitry including processing elements (PEs) or multiplier and accumulator (MAC) circuitry) may not be processing real or valid outputs and therefore corresponds to redundant processing, thereby increasing power consumption.

To solve this problem, in some implementations, instead of building accelerators optimized only for large convolutions, an accelerator can provide high throughput and low latency for larger convolutions while maintaining efficiency for smaller convolutions at the same time. For example, a large convolution output can be partitioned or split into smaller convolution outputs that can fit into fixed dimensions of an array of processing elements (PE) (see PE(s) 120 in FIG. 1B). Each of the smaller convolution output can be generated by a group of PEs assigned to the smaller convolution output. In this manner, because smaller convolution outputs can fit into the fixed dimension of the PE array, convolutions for such smaller outputs can be performed without executing all PEs in the PE array. In some embodiments, for a PE array of (M×N) dimension where each of M and N is an integer greater than 1, a large convolution output can be partitioned (or split or divided) into one of the following illustrative types of smaller convolution outputs: (1) an (M×N) convolution output matrix; (2) an (M/2×N) convolution output matrix; (3) an (M×N/2) convolution output matrix; and (4) an (M/2×N/2) convolution output matrix. In some embodiments, each type of smaller convolution output may be generated or updated as follows: (1) to generate the (M×N) convolution output matrix, the output is assigned to or tiled into (M×N) blocks of the PE array (e.g., the whole array) and updated using an (M×K) input matrix and a (K×N) kernel matrix as operands to the accelerator; (2) to generate the (M/2×N) convolution output matrix, the output is assigned to or tiled into (M/2×N) blocks of the PE array and updated using an (M/2×K/2) input matrix and a (K/2×N) kernel matrix as operands to the accelerator; (3) to generate the (M×N/2) convolution output matrix, the output is assigned to or tiled into (M×N/2) blocks of the PE array and updated using an (M×K/2) input matrix and a (K/2×N/2) kernel matrix as operands to the accelerator; and (4) to generate the (M/2×N/2) convolution output matrix, the output is assigned to or tiled into (M/2×N/2) blocks of the PE array and updated using an (M/2×K/2) input matrix and a (K/2×N/2) kernel matrix as operands to the accelerator. Each block of the PE array may include one PE (or multiple PEs).

Moreover, in view of repetitive access and/or processing of input data and kernels in performing a convolution operation power consumption and delay may increase. An operand to an accelerator that is persistent across invocations (e.g., invocations of convolution operations) can be referred to as a "stationary" operand. Referring to FIG. 2A, each kernel (e.g., kernel value or kernel element) in the kernel matrix can be a stationary operand during a convolution operation (to output a column of the convolution output matrix corresponding to the kernel), because each kernel in the matrix does not change during the convolution operation. For example, referring FIG. 2A, a kernel 216 in the kernel matrix 212 is a stationary operand during a convolution operation to output a column 217 of the convolution output matrix 213 corresponding to the kernel 216. On the other hand, an operand to the accelerator that changes during a certain operation of AI-related processing (e.g., a convolution operation) can be referred to as a streaming operand. For example, the M data chunks in the input matrix 211 can be streaming operands during a convolution operation to output a column 217 of the convolution output matrix 213.

To solve the problem of redundant operations, in some embodiments, a memory (e.g., a number of registers, flipflop circuits (e.g., FLOPs) or latches) may be added to each PE-120 to hold a stationary operand, thereby reducing energy by reducing the number of fetches from a storage device (e.g., SRAM) from a storage device 126. In some embodiments, cache or buffer memory may be used as a memory holding a stationary operand. In some embodiments, R number of FLOPs may be added to each PE to hold kernel data (e.g., the kernel matrix 212) as a stationary operand, so as to avoid redundant fetches of the stationary operand when the convolution/GEMM's reduced size (dimensions for instance) is less than or equal to K×R.

The systems and methods described in the present disclosure include several advantages over known systems and methods. First, in some embodiments, the disclosure provides a solution for handling small convolutions (e.g., convolutions that generate a relatively smaller size of output, as compared to) to achieve low energy and latency while providing high throughput. Second, in some embodiments, the disclosure provides various types (e.g., 4 types) or configurations of smaller convolution outputs from which a larger convolution output can be partitioned. This partitioning can allow an AI accelerator's compute throughput to be relatively high for a wide range of GEMM/convolution dimensions. Third, addition of local memory (or buffer) to each PE can enable a modular structure so that a smaller number of PEs can be deployed to provide sufficient throughput and also save energy. Moreover, such addition of local memory can save data movement cost by avoiding redundant fetches (e.g., of stationary data) from a memory (e.g., SRAM 126 in FIG. 1B).

FIG. 2B to FIG. 2E are block diagrams of embodiments of a device including a plurality of processing elements (PEs) for performing AI related processing to generate a plurality of outputs for a layer of a neural network, according to one or more example implementations of the present disclosure.

Figure 2B:
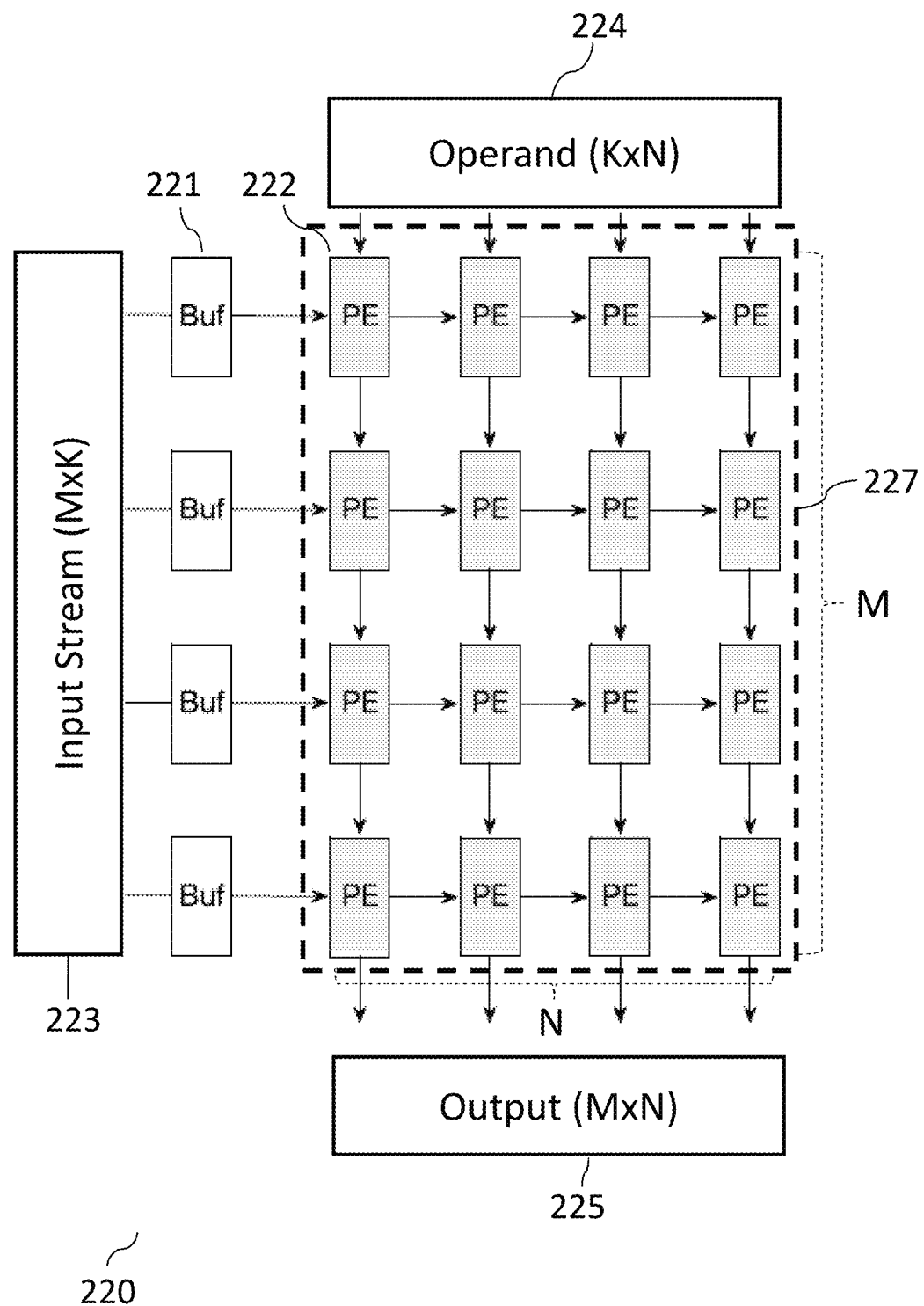
FIG. 2B to FIG. 2E are block diagrams of embodiments of a device for generating a plurality of outputs for a layer of a neural network, according to one or more example implementations of the present disclosure.

Referring to FIG. 2B, and in some embodiments, an accelerator 220 may include one or more elements of accelerator 108 (see FIG. 1B), and can include an (M×N) PE array or matrix. In some embodiments, the number of PEs in the PE array may be 1 k or 2 k. In some embodiments, a processor of the accelerator (e.g., having one or more features of the processor 124 in FIG. 1A) may determine the number and/or array dimensions of the PEs in consideration of optimal energy consumption. In some embodiments, the processor may determine the number and/or array dimensions of the PEs based on measurement data and/or an estimation of power consumptions of the accelerator 220 subject to different input streams 223 and different operand data 224.

In some embodiments, in the accelerator 220, an input stream 223 may be read, output or accessed from the storage device 126 (see, e.g., FIG. 1B). In some embodiments, an input stream 223 may include or provide data that is represented and/or arranged in an (M×K) input matrix (see FIG. 2A). In some embodiments, the input stream 223 may be stored in a buffer 221 for a respective row of PEs 222. For example, each buffer 221 may store a portion of the input stream 223 for a corresponding row of PEs 222. The input stream 223 can be directed to one row (horizontal bank or group) of PEs 222, or can be shared across one or more of the PEs, or partitioned into data portions as inputs for respective PEs. Operand data 224 can be directed or provided to a column (vertical bank or group) of PEs. In some embodiments, the operand data 224 may be represented and/or arranged in a (K×N) kernel matrix (see FIG. 2A). In some embodiments, the operand data 224 may include kernel data which can include weights (or weight information) in a weight stream. Each of the PEs in the column may share the same operand information or receive corresponding operand information. The input (from the input stream 223) and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and output as output data 225. In some embodiments, the output data 225 may be represented and/or arranged in a (M×N) convolution output matrix (see FIG. 2A). In some embodiments, the output data 225 may be stored in a buffer (e.g., the buffer 130 in FIG. 1B) for the respective column of PEs. The buffer(s) can provide, transfer, route, write and/or store the received outputs to the storage device 126 (see, e.g., FIG. 1B). In some embodiments, the outputs (e.g., activation data from one layer of the neural network) that are stored to the storage device 126 (see FIG. 1B) can be retrieved or read from the storage device 126, and be used as inputs to the array of PEs 120 for processing (of a subsequent layer of the neural network) at a later time.

In some embodiments, a PE array with dimensions of (M×N), may receive input data to generate a plurality of outputs for a layer of a neural network. In some embodiments, the plurality of outputs may be a plurality of convolution outputs (e.g., outputs generated by convolution operations performed by the PEs) arranged in a first array (not illustrated). The processor may compare the dimensions of the first array of the outputs, with the dimensions of the PE array (e.g., (M×N), for the PE array in FIG. 2B). The processor may partition, according to a result of the comparing (e.g., in response to a determination that one dimension of the first array is greater than or equal to the corresponding dimension of the PE array), the first array into subarrays each having dimensions less than or equal to the dimensions of the PE array.

In some embodiments, partitioning of the first array may be statically configured. For example, the processor may partition (or split or divide or map) the first array into at least one of the following illustrative types of subarrays (e.g., that support smaller convolution outputs, as compared to one larger than the first array): (1) an (M×N) convolution output matrix (see FIG. 2B); (2) an (M/2×N) convolution output matrix (see FIG. 2C); (3) an (M×N/2) convolution output matrix (e.g., see FIG. 2D); and (4) an (M/2×N/2) convolution output matrix (see FIG. 2B). In some embodiments, partitions may be dynamically configured, for example by the processor 124, using a state machine for instance.

Referring to FIG. 2B, in response to partitioning (or splitting or dividing or mapping) the first array to provide an (M×N) subarray, the processor may assign an (M×N) convolution output matrix to (M×N) blocks 227 of the PE array (e.g., the whole array). Each block of the PE array can include one or more PEs. In some embodiments, the (M×N) convolution output matrix may be tiled or mapped into the (M×N) blocks 227 and updated using the (M×K) input stream 223 and the (K×N) operand data 224. In some embodiments, each PE of the (M×N) blocks 227 assigned to the (M×N) convolution output matrix may generate or update a corresponding output of the (M×N) convolution output matrix using a portion of the (M×K) input stream 223 and the (K×N) operand data 224. In some embodiments, each PE of the (M×N) blocks 227 may store the corresponding generated or updated output in a corresponding buffer (e.g., the buffer 130 in FIG. 1B). In some embodiments, the buffers 130 may be arranged in an (M×N) array or matrix, and/or may include N buffers 130 for instance one for each column of PEs. In some embodiments, the accelerator 220 may write the (M×N) output data 225 stored in the buffers to the storage device 126 (see FIG. 1B).

Figure 2C:
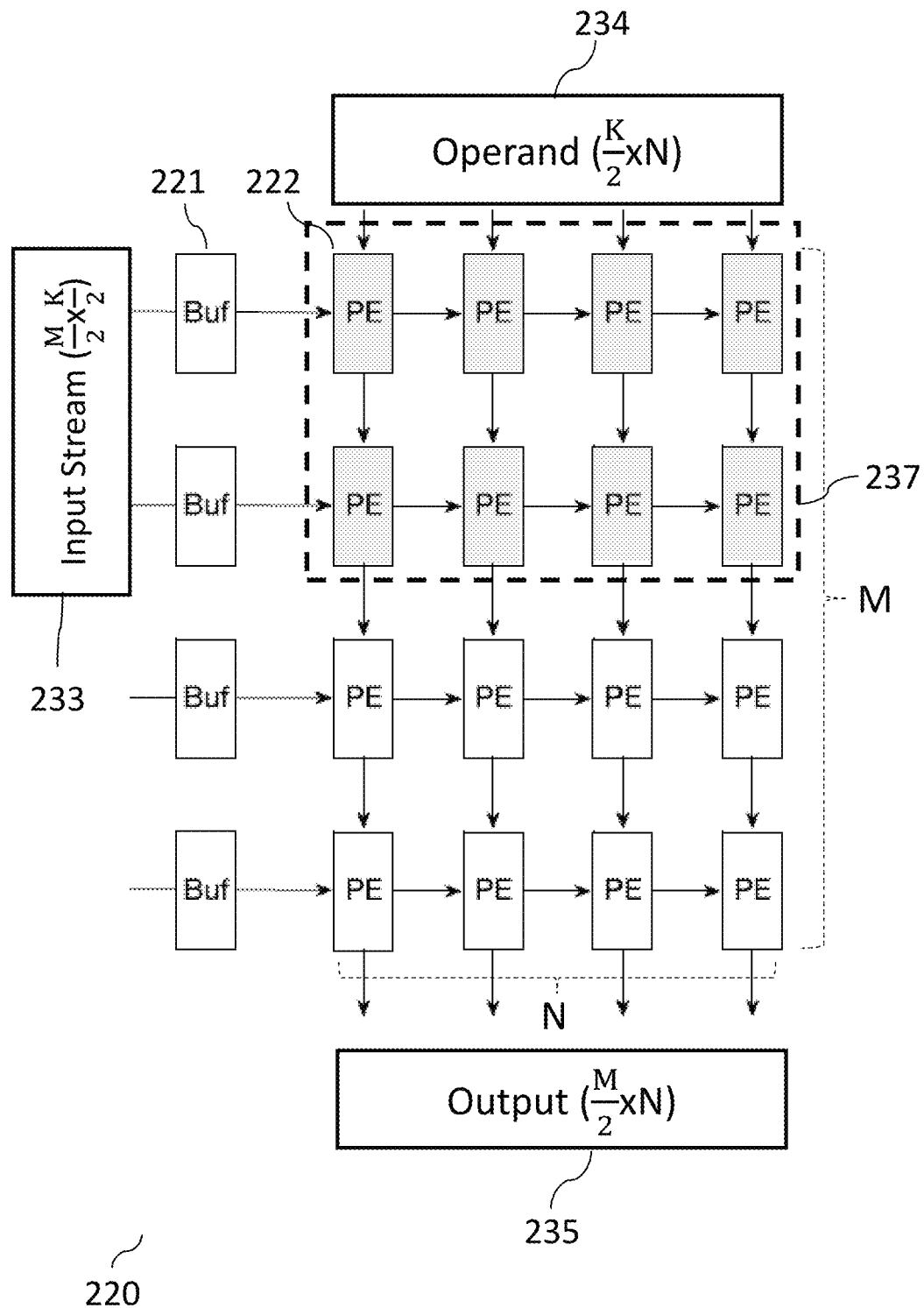

Referring to FIG. 2C, in response to partitioning (or splitting or dividing or mapping) the first array to provide an (M/2×N) subarray, the processor may assign an (M/2×N) convolution output matrix to (M/2×N) blocks 237 of the PE array. Each block of the PE array can include one or more PEs. In some embodiments, the (M/2×N) convolution output matrix may be tiled or mapped into the (M/2×N) blocks 237 and updated using an (M/2×K/2) input stream 233 and (K/2×N) operand data 234. In some embodiments, each PE of the (M×N) blocks 237 assigned to the (M/2×N) convolution output matrix may generate or update a corresponding output of the (M/2×N) convolution output matrix using a portion of the (M/2×K/2) input stream 233 and the (K/2×N) operand data 234. In some embodiments, each PE of the (M/2×N) blocks 237 may store the corresponding generated or updated output in a corresponding buffer (e.g., the buffer 130 in FIG. 1B). In some embodiments, the accelerator 220 may write an (M/2×N) dimensioned output data 235 held or stored in the buffers, to the storage device 126 (see FIG. 1B).

Figure 2D:
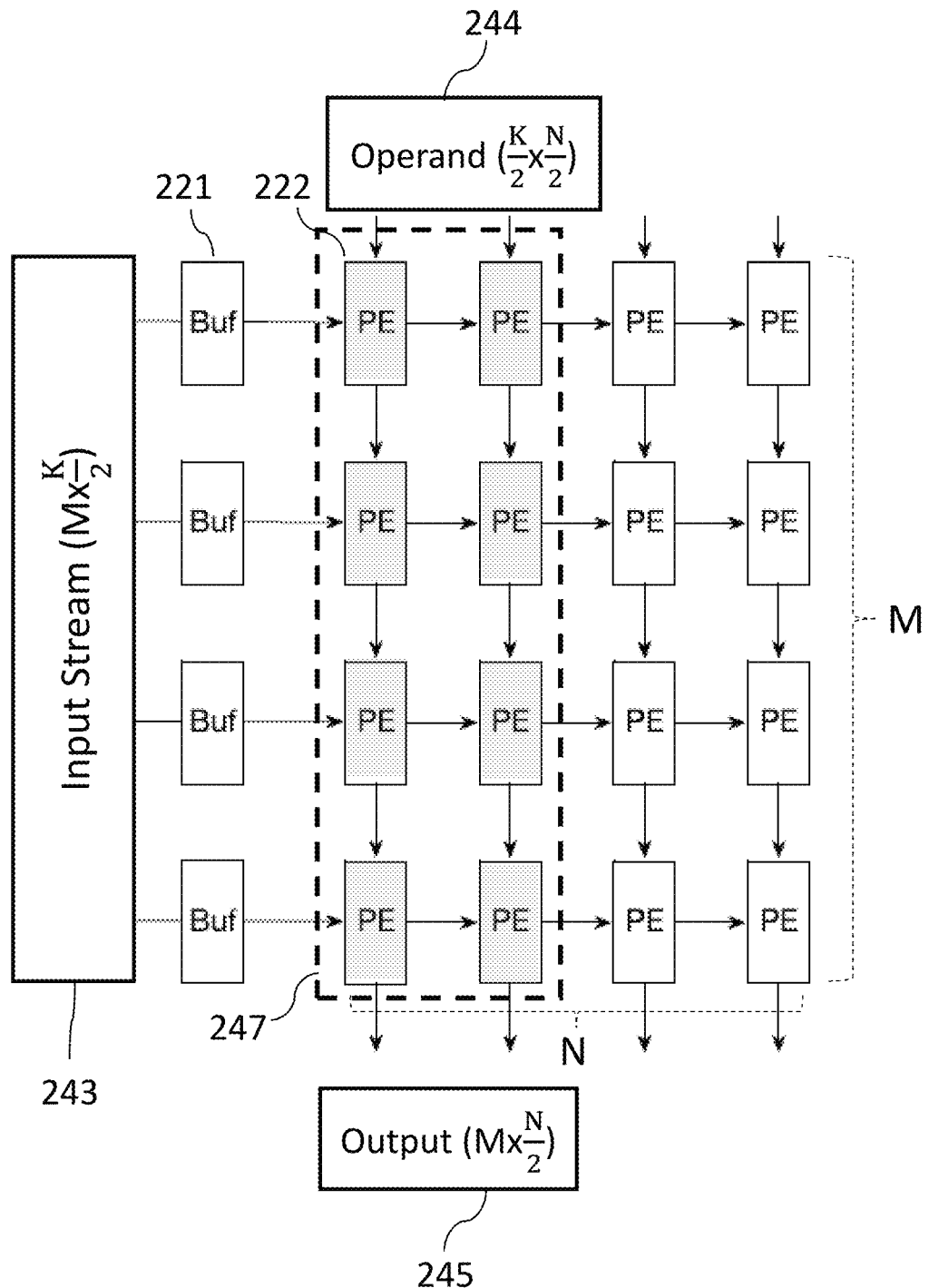

Referring to FIG. 2D, in response to partitioning (or splitting or dividing or mapping) the first array to provide an (M×N/2) subarray, the processor may assign an (M×N/2) convolution output matrix to (M×N/2) blocks 247 of the PE array. Each block of the PE array can include one or more PEs. In some embodiments, the (M×N/2) convolution output matrix may be tiled into the (M×N/2) blocks 247 and updated using an (M×K/2) input stream 243 and (K/2×N/2) operand data 244. In some embodiments, each PE of the (M×N/2) blocks 247 assigned to the (M×N/2) convolution output matrix may generate or update a corresponding output of the (M×N/2) convolution output matrix using a portion of the (M×K/2) input stream 243 and the (K/2×N/2) operand data 244. In some embodiments, each PE of the (M×N/2) blocks 247 may store the corresponding generated or updated output in a corresponding buffer (e.g., the buffer 130 in FIG. 1B). In some embodiments, the accelerator 220 may write an (M×N/2) dimensioned output data 245 held or stored in the buffers, to the storage device 126 (see FIG. 1B).

Figure 2E:
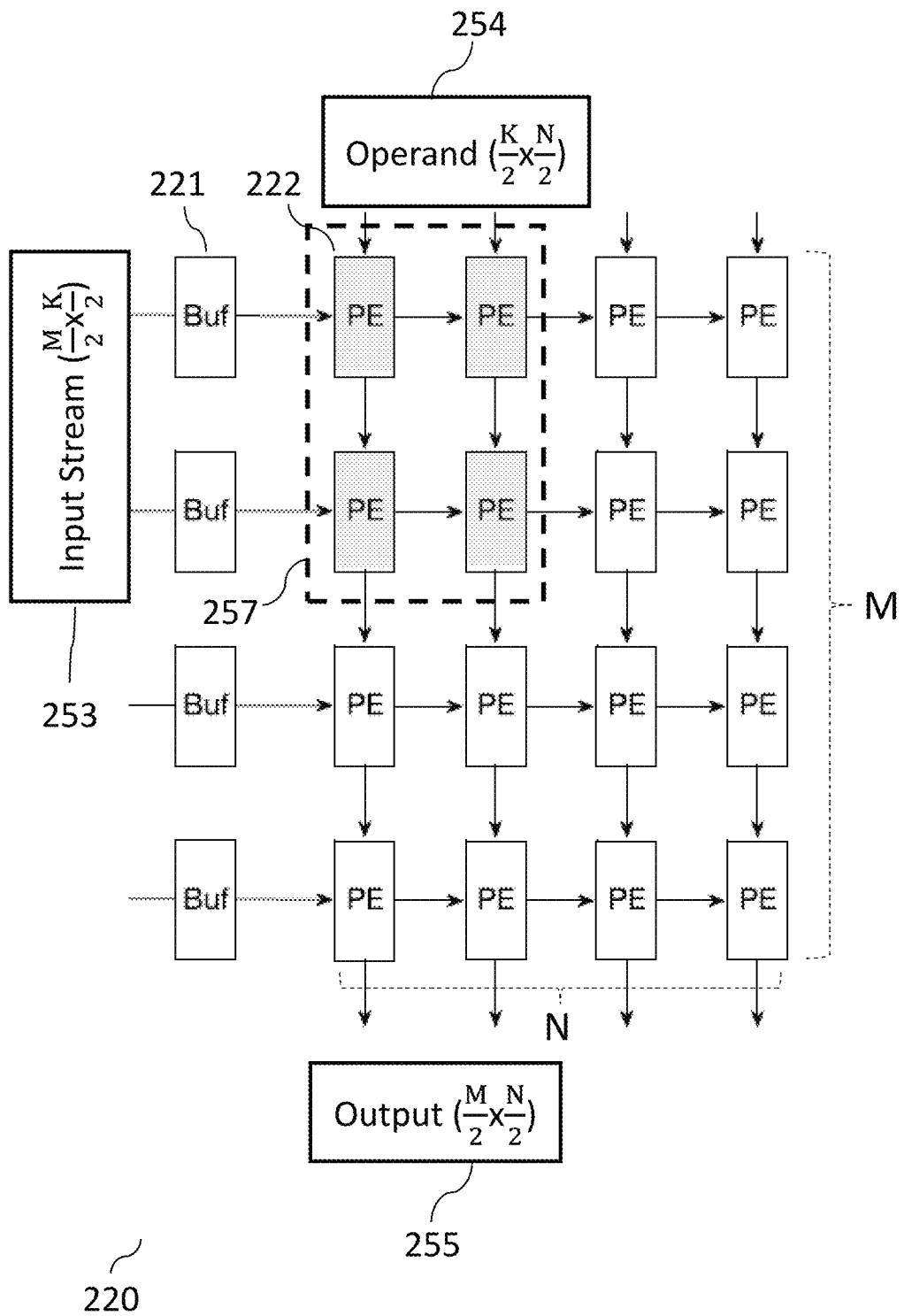

Referring to FIG. 2E, in response to partitioning (or splitting or dividing or mapping) the first array to provide an (M/2×N/2) subarray, the processor may assign an (M/2×N/2) convolution output matrix to (M/2×N/2) blocks 257 of the PE array. Each block of the PE array can include one or more PEs. In some embodiments, the (M/2×N/2) convolution output matrix may be tiled into the (M/2×N/2) blocks 257 and updated using an (M/2×K/2) input stream 253 and (K/2×N/2) operand data 254. In some embodiments, each PE of the (M/2×N/2) blocks 257 assigned to the (M/2×N/2) convolution output matrix may generate or update a corresponding output of the (M/2×N/2) convolution output matrix using a portion of the (M/2×K/2) input stream 253 and the (K/2×N/2) operand data 254. In some embodiments, each PE of the (M/2×N/2) blocks 257 may store the corresponding generated or updated output in a corresponding buffer (e.g., the buffer 130 in FIG. 1B). In some embodiments, the accelerator 220 may write an (M/2×N/2) dimensioned output data 255 held or stored in the buffers, to the storage device 126 (see FIG. 1B).

Figure 2F:
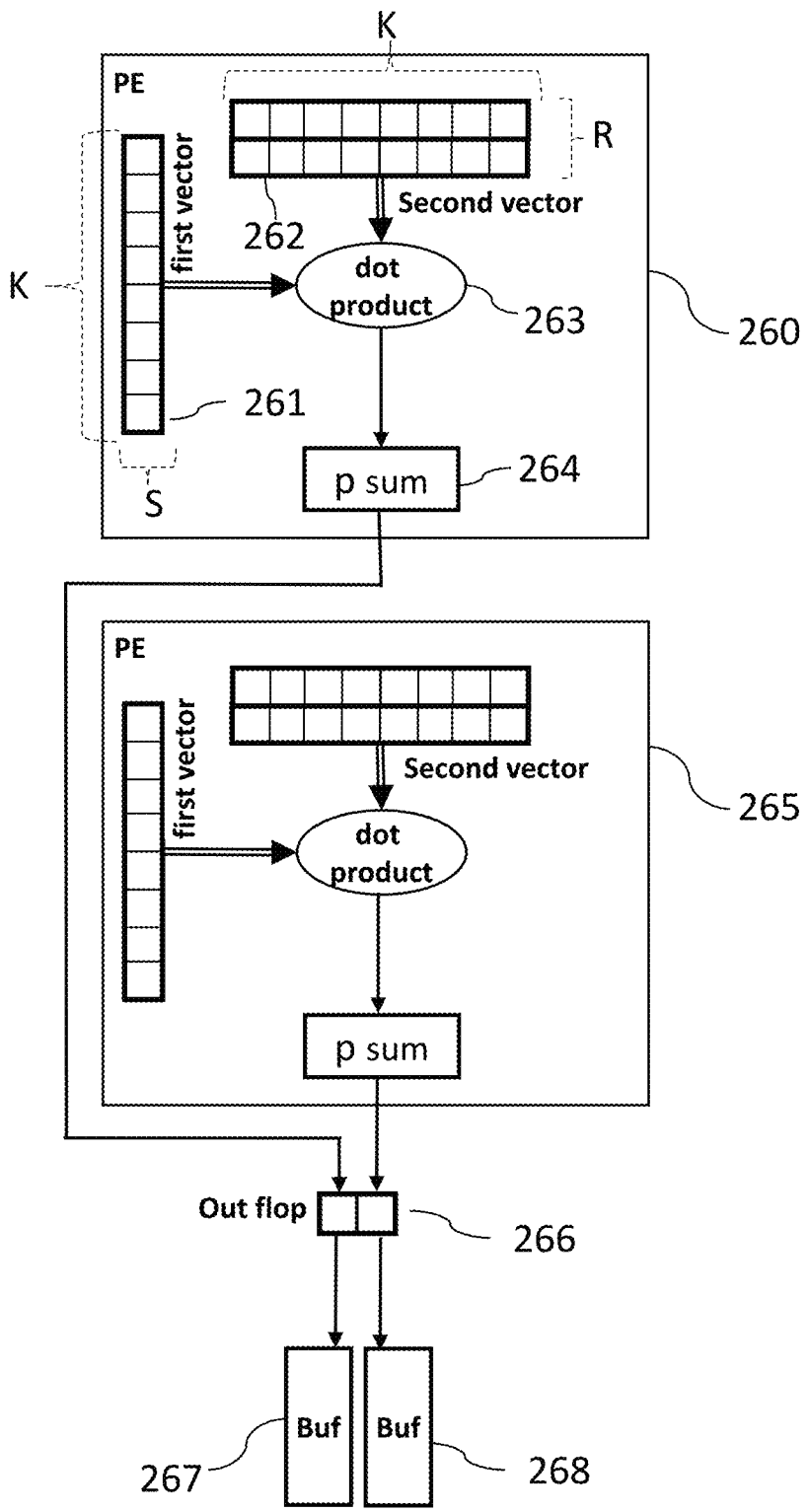
FIG. 2F is a block diagram of an embodiment of processing units (PEs) for generating a plurality of outputs for a layer of a neural network, according to an example implementation of the present disclosure.

FIG. 2F is a block diagram of an embodiment of processing units (PEs) for performing AI related processing to generate a plurality of outputs for a layer of a neural network, according to an example implementation of the present disclosure.

Referring to FIG. 2F, and in some embodiments, a PE 260 may include a first memory 261 and a second memory 262. In some embodiments, the PE 260 may include a MAC unit (e.g., having one or more features of the MAC unit 140 in FIG. 1C) to perform or calculate a dot product 263 of (1) a first vector of input stream 223 data stored in the first memory 261 and (2) a second vector of operand data 224. The MAC unit of the PE 260 may include an accumulator 264 to store a result of the dot product operation. Another PE 265 has similar configuration. In response to completion of a convolution operation on an input stream and operand data (e.g., completion of calculating a dot product of a vector from the input stream and a vector from the operand data) corresponding to each PE, the PE (260 or 265 in FIG. 2F) may output the corresponding result of the convolution operation to a corresponding column position of an out flop 266. In some embodiments, in response to outputting results of convolution operations from PEs in the same row, the out flop 266 (e.g., one or more register or flopflop devices) may write the results of the convolution operations to corresponding column positions (or column banks) of buffers 267 and 268.

In some embodiments, each of the first memory 261 and the second memory 262 may include a number of FLOPs (flipflops or registers) or latches to hold a stationary operand, thereby reducing energy by reducing number of fetches (e.g., from a storage device 126). In some embodiments, cache or buffer memory (e.g., SRAM) may be used as each of the first memory 261 and the second memory 262. In some embodiments, the second memory may store up to a (K×R) dimensioned operand where R is smaller than or equal to N. For example, each of the first memory 261 and the second memory 262 may store up to 32 bytes data. With this configuration, each PE can hold up to a (K×R) dimensioned kernel data (e.g., the kernel matrix 212) as a stationary operand, so as to avoid redundant fetches of the stationary operand (from SRAM, for example) when the convolution/GEMM's reduced size or dimensions are less than or equal to K×R.

Similarly, in some embodiments, the first memory 261 may store up to (S×K) input stream where S is smaller than or equal to M. With this configuration, each PE can hold up to (S×K) input stream data (e.g., the input matrix 211), so as to reduce the number of times the input stream data is to be fetched (from SRAM, for example) when S is greater than 1. In this case, the input stream data can be reused up to S times without fetching new input stream data from the SRAM for instance.

Figure 2G:
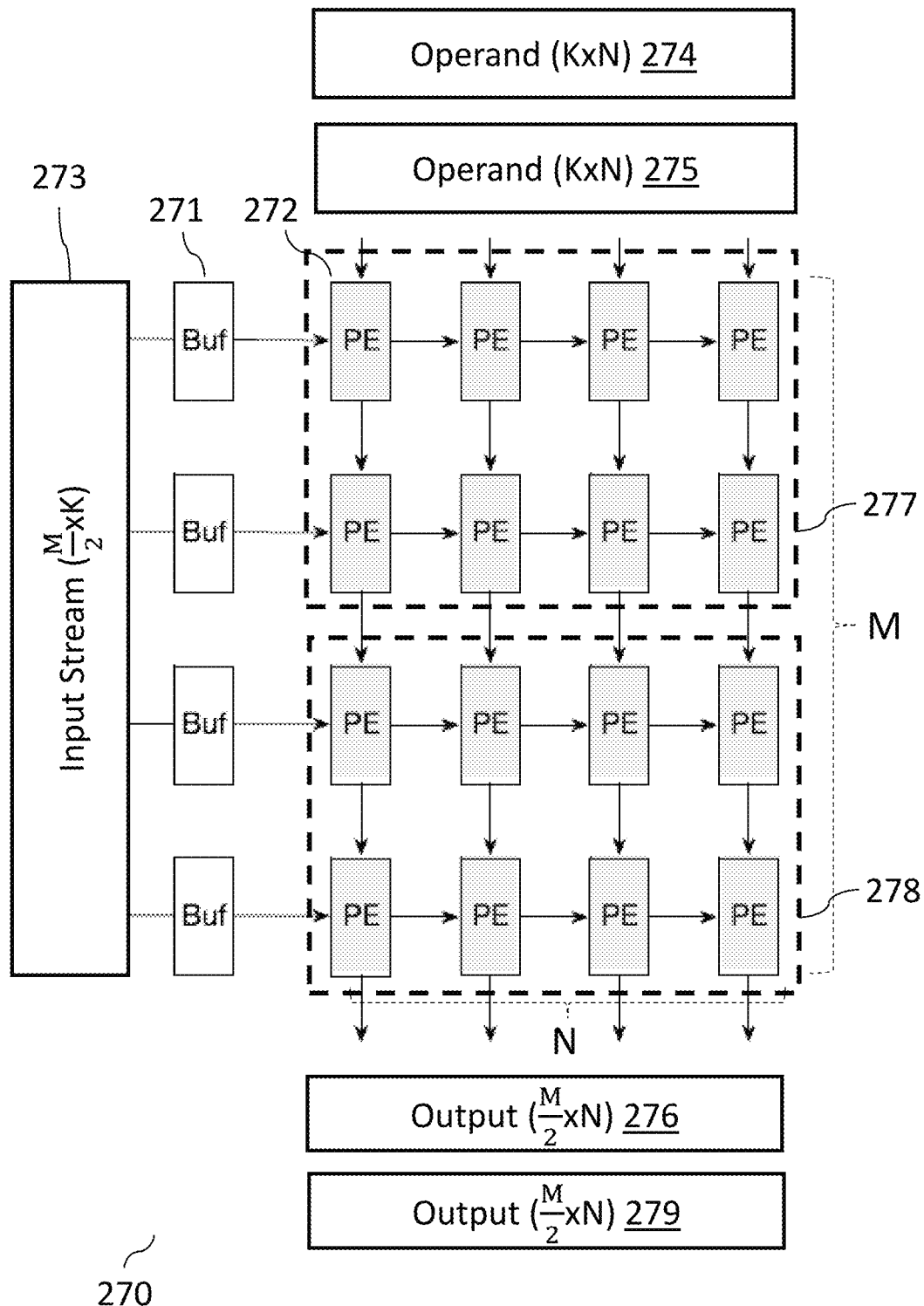
FIG. 2G is a block diagram of an embodiment of a method for assigning PEs to subarrays of outputs, according to an example implementation of the present disclosure.

FIG. 2G is a block diagram of an embodiment of a method for assigning PEs to subarrays of outputs of AI related processing, according to an example implementation of the present disclosure. Referring to FIG. 2G, and in some embodiments, an accelerator 270 may include an (M×N) PE array or matrix, and input stream buffers 271. In some embodiments, each PE 272 of the accelerator 270 may have a configuration similar to that of the PE 260 in FIG. 2F. In some embodiments, for the PE array with dimensions of (M×N), the processor may receive input data to generate a plurality of outputs for a layer of a neural network. For example, referring to FIG. 2G, if the plurality of outputs are arranged in a (M/2×2N) array (not illustrated), the processor may compare the dimensions of the (M/2×2N) array with dimensions of the (M×N) dimensioned PE array. In response to a determination that the column dimension of the (M/2× 2N) array, i.e., 2N, is greater than or equal to the corresponding dimension of the PE, i.e., N, the processor may partition the (M/2×2N) array into two subarrays, for example, a first subarray and a second subarray, to fit into the (M×N) PE array such that each of the first subarray and the second subarray has dimensions of (M/2×N), which are less than or equal to the dimensions of the PE array, (M×N).

Referring again to FIG. 2G, in response to partitioning (or splitting or dividing or mapping) the (M/2×2N) array into the (M/2×N) first subarray and the (M/2×N) second subarray, the processor may assign the (M/2×N) first subarray to (M/2×N) blocks 277 of the PE array and assign the (M/2×N) second subarray to (M/2×N) blocks 278 of the PE array. In some embodiments, the (M/2×N) first subarray may be tiled or mapped into the (M/2×N) blocks 277 and updated using the (M/2×K) input stream 273 and (K×N) operand data 275. In some embodiments, each PE of the (M/2×N) blocks 277 assigned to the (M/2×N) first subarray may generate or update a corresponding output of the (M/2×N) first subarray using a portion of the (M/2×K) input stream 273 and (K×N) operand data 274. In some embodiments, each PE of the (M/2×N) blocks 277 may store the corresponding generated or updated output in a corresponding buffer (e.g., the buffer 130 in FIG. 1B) as (M/2×N) output data 276. Similarly, in some embodiments, the (M/2×N) second subarray may be tiled or mapped into the (M/2×N) blocks 278 and updated using the (M/2×K) input stream 273 and (K×N) operand data 275. In some embodiments, each PE of the (M/2×N) blocks 278 assigned to the (M/2×N) second subarray may generate or update a corresponding output of the (M/2×N) second subarray using a portion of the (M/2×K) input stream 273 and the (K×N) operand data 275. In some embodiments, each PE of the (M/2×N) blocks 278 may store the corresponding generated or updated output in a corresponding buffer (e.g., the buffer 130 in FIG. 1B) as (M/2×N) output data 279.

In some embodiments, input data structure for the PEs of the (M/2×N) blocks 277 and the (M/2×N) blocks 278 may be determined by the processor. The processor may determine, according to the partitioning, how to direct or route particular portions of input data to the PEs in various subarrays. In some embodiments, the processor may identify a common portion of the input data that is to be shared and processed among the (M/2×N) blocks 277 and the (M/2×N) blocks 278. For example, the processor may identify the (M/2×K) input stream 273 as a common portion and cause the accelerator 270 to direct, shift or route the (M/2×K) input stream 273 to both the (M/2×N) blocks 277 and the (M/2×N) blocks 278. In some embodiments, the processor may identify a portion of input data used for (M/2×N) blocks 277. For example, the processor may identify the (K×N) operand data 274 as a portion of input data used for (M/2×N) blocks 277, and can cause the accelerator 270 to direct, shift or route the (K×N) operand data 274 to the (M/2×N) blocks 277. Similarly, the processor may identify the (K×N) operand data 275 as a portion of input data used for (M/2×N) blocks 278 and can cause the accelerator 270 to direct, shift or route the (K×N) operand data 275 to the (M/2×N) blocks 278.

In some embodiments, the second memory 262 (see FIG. 2F) of each PE in the (M/2×N) blocks 277 may store up to an (K×R) operand (R is smaller than or equal to N) from the (K×N) operand data 274, so as to avoid redundant fetches of the stationary operand from SRAM. Similarly, the second memory 262 (see FIG. 2F) of each PE in the (M/2×N) blocks 278 may store up to an (K×R) operand (R is smaller than or equal to N) from the (K×N) operand data 275, so as to avoid redundant fetches of the stationary operand from SRAM.

In some embodiments, the first memory 261 (see FIG. 2F) of each PE in the (M/2×N) blocks 277 may store up to a (S×K) dimensioned or sized input stream (S is smaller than or equal to M) from the (M/2×K) dimensioned or sized input stream 273, thereby reusing the input stream data up to S times without fetching new input stream data from SRAM. Similarly, the first memory 261 (see FIG. 2F) of each PE in the (M/2×N) blocks 278 may store up to a (S×K) dimensioned or sized input stream (S is smaller than or equal to M) from the (M/2×K) dimensioned or sized input stream 273, thereby reusing the input stream data up to S times without fetching new input stream data from SRAM.

Figure 2H:
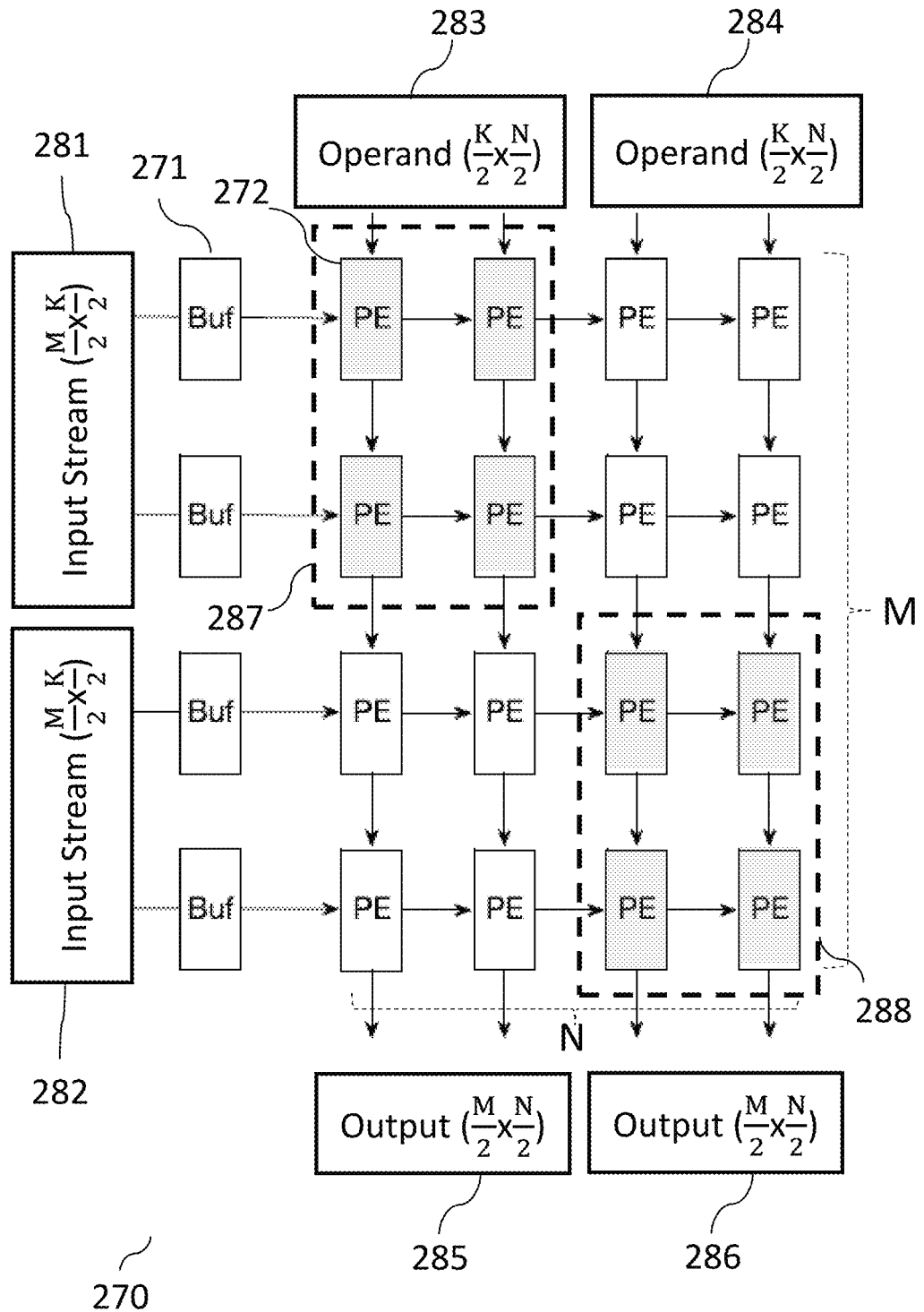
FIG. 2H is a block diagram of an embodiment of a method for assigning two groups of PEs to two arrays of outputs, according to an example implementation of the present disclosure.
Figure 21:
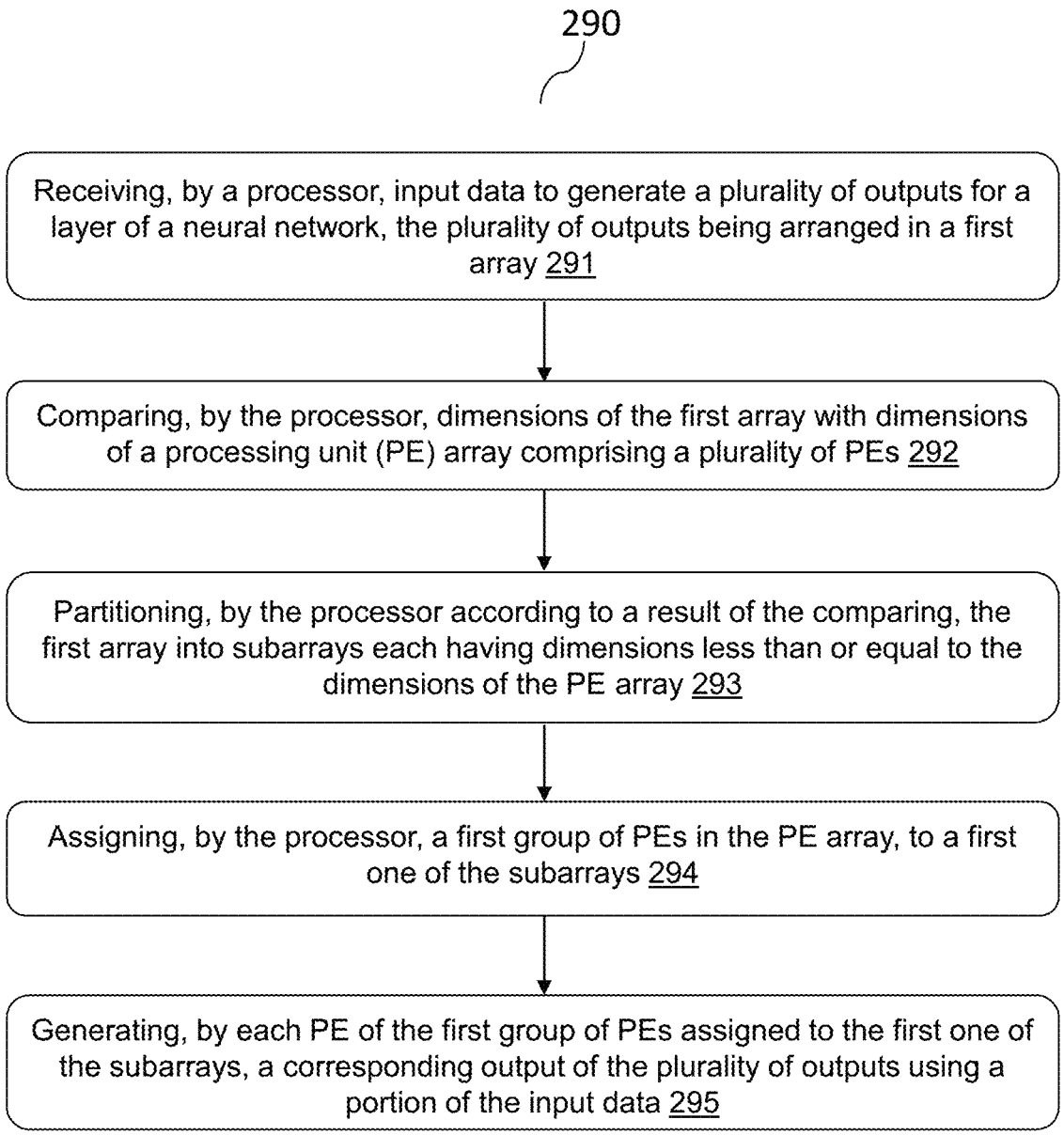

FIG. 2H is a block diagram of an embodiment of a method for assigning two groups of PEs at different (e.g., isolated or separate) locations, to outputs of AI related processing, according to an example implementation of the present disclosure. Referring to FIG. 2H, and in some embodiments, for the PE array with dimensions of (M×N), the processor may receive two separate input data (corresponding to input streams 281, 282), each of which is used to generate a respective plurality of outputs arranged in an array, for a layer of a neural network. For example, referring to FIG. 2H, the processor may receive the two input data corresponding to a (M/2×N/2) first output array (not illustrated) and a (M/2×N/2) second output arrays (not illustrated) respectively, both of which have dimensions less than or equal to the dimensions of the PE array (M×N). In response to identifying the (M/2×N/2) first output array and the (M/2×N/2) second subarray, the processor may assign the (M/2×N/2) first output array to (M/2×N/2) blocks 287 of the PE array and assign the (M/2×N/2) second output array to (M/2×N/2) blocks 288 of the PE array. In some embodiments, the (M/2×N/2) first output array may be tiled or mapped into the (M/2×N/2) blocks 287 and updated using the (M/2×K/2) input stream 281 and (K/2×N/2) operand data 283. In some embodiments, each PE of the (M/2×N/2) blocks 287 assigned to the (M/2×N/2) first output array may generate or update a corresponding output of the (M/2×N/2) first output array using a portion of the (M/2×K/2) input stream 281 and (K/2×N/2) operand data 283. In some embodiments, each PE of the (M/2×N/2) blocks 287 may store the corresponding generated or updated output in a corresponding buffer (e.g., the buffer 130 in FIG. 1B) as (M/2×N/2) output data 285. Similarly, in some embodiments, the (M/2×N/2) second output array may be tiled or mapped into the (M/2×N/2) blocks 288 and updated using the (M/2×K/2) input stream 282 and (M/2×N/2) operand data 284. In some embodiments, each PE of the (M/2×N/2) blocks 288 assigned to the (M/2×N/2) second output array may generate or update a corresponding output of the (M/2×N/2) second output array using a portion of the (M/2×K/2) input stream 282 and (K/2×N/2) operand data 284. In some embodiments, each PE of the (M/2×N/2) blocks 288 may store the corresponding generated or updated output in a corresponding buffer (e.g., the buffer 130 in FIG. 1B) as (M/2×N/2) output data 286.

In some embodiments, input data structure for the PEs of the (M/2×N/2) blocks 287 and the (M/2×N/2) blocks 288 may be determined by the processor. In some embodiments, in response to identifying that the two input data for the first and second output arrays are separate from each other, the processor may determine that there is no common portion of input data among the (M/2×N/2) blocks 287 and the (M/2×N/2) blocks 288 (e.g., as subarrays of PEs). In some embodiments, in response to a determination that there is no common portion of input data among the (M/2×N/2) blocks 287 and the (M/2×N/2) blocks 288, the processor may assign the (M/2×N/2) first output array and the (M/2×N/2) second output array to two subarrays of PEs at different (e.g., separate or isolated) locations, e.g., to (M/2×N/2) blocks 287 of the PE array and the (M/2×N/2) blocks 288 of the PE array. In some embodiments of the present disclosure, a device (e.g., the accelerator 220 in FIG. 2B) may include a processor of the device (e.g., the processor 124 in FIG. 1A) and a processing unit (PE) array (e.g., the (M×N) PE array in FIG. 2B). The PE array may include a plurality of PEs (e.g., PEs 222 in FIG. 2B). The processor may be configured to receive input data to generate a plurality of outputs for one or more neurons/nodes of a layer of a neural network, the plurality of outputs being arranged in a first array. In some embodiments, the plurality of outputs may be outputs of convolution operations (see FIG. 2A) for the layer of a neural network. The processor may be configured to compare dimensions of the first array with dimensions of the PE array (e.g., (M×N) in FIG. 2B). The processor may be configured to partition, according to a result of the comparing, the first array into subarrays each having dimensions less than or equal to the dimensions of the PE array. The processor may be configured to assign a first group of PEs (e.g., the (M/2×N) blocks 277 of PEs in FIG. 2G) in the PE array, to a first one of the subarrays. Each PE of the first group of PEs that are assigned to the first one of the subarrays (e.g., the (M/2×N) blocks 277 of PEs in FIG. 2G), may be configured to generate a corresponding output of the plurality of outputs using a portion of the input data (e.g., the (M/2×K) input stream 273, the (K×N) operand data 274 in FIG. 2G).

In some embodiments, the PE array may be a two-dimensional M×N array (see FIGS. 2B-2E and 2G-2H). Each of M and N is an integer greater than 1. The processor may be configured to partition the first array to provide one or more of an M×N array (see FIG. 2B), an M×N/2 array (see FIG. 2D), an M/2×N array (see FIG. 2C), an M/2×N/2 array (see FIG. 2E), and/or other arrays of various dimensions.

In some embodiments, the processor may be configured to determine whether a size of the first array in a first dimension (e.g., 2N in (M/2×2N) array in FIG. 2G) is greater than a size of the PE array in the first dimension (e.g., N in (M×N) PE array in FIG. 2G). In response to determining that the size of the first array in the first dimension is greater than the size of the PE array in the first dimension, the processor may be configured to partition the first array into the first one and a second one of the subarrays. The processor may be configured to assign the first subarray to the first group of PEs (e.g., the (M/2×N) blocks 277 in FIG. 2G) in the PE array and assign the second subarray to a second group of PEs (e.g., the (M/2×N) blocks 278 in FIG. 2G) in the PE array different from the first group of PEs.

In some embodiments, the processor may be further configured to identify a common portion of the input data (e.g., the (M/2×K) input stream 273 in FIG. 2G) to be used by both the first and second groups of PEs. The processor may be further configured to direct, route or shift the common portion of the input data (e.g., the (M/2×K) input stream 273 in FIG. 2G) into the first and second groups of PEs (e.g., the (M/2×N) blocks 277 and the (M/2×N) blocks 278 in FIG. 2G).

In some embodiments, the processor may be further configured to identify a first portion of the input data (e.g., the (K×N) operand data 274 in FIG. 2G) to be used by the first group of PEs and a second portion of the input data (e.g., the (K×N) operand data 275 in FIG. 2G) to be used by the second group of PEs. The processor may be further configured to direct, route or shift the first portion of the input data (e.g., the (K×N) operand data 274 in FIG. 2G) into the first group of PEs (e.g., the (M/2×N) blocks 277 in FIG. 2G). The processor may be further configured to direct, route or shift the second portion of the input data (e.g., the (K×N) operand data 275 in FIG. 2G) into the second group of PEs (e.g., the (M/2×N) blocks 278 in FIG. 2G).

In some embodiments, the input data may include a first plurality of input values (e.g., representing elements of the input matrix 211 in FIG. 2A) and a second plurality of input values (e.g., representing elements of the kernel matrix 212 in FIG. 2A). Each PE of the first group of PEs (e.g., the PE 260 in FIG. 2F) may include a first buffer memory (e.g., the first memory 261 in FIG. 2F), a second buffer memory (e.g., the first memory 262 in FIG. 2F) and/or multiplier and accumulator (MAC) circuitry (e.g., the MAC unit 140 in FIG. 1C). In generating the corresponding output of the plurality of outputs, each PE of the first group of PEs may be configured to receive first values (e.g., the first vector in FIG. 2F) of the first plurality of input values and second values (e.g., the second vector in FIG. 2F) of the second plurality of input values. Each PE of the first group of PEs (e.g., the PE 260 in FIG. 2F) may be configured to store the first values and the second values (e.g., the first vector and the second vector in FIG. 2F) in the first buffer memory and the second buffer memory (e.g., the first memory 261 and the second memory 262 in FIG. 2F), respectively. Each PE of the first group of PEs may be configured to generate, via the MAC circuitry, a result of a first dot product operation between the first values and the second values (e.g., the dot product 263 in FIG. 2F).

In some embodiments, each PE may be configured to store a first number of sets of values (e.g., S number of first vectors in FIG. 2F) out of the plurality of first input values, in the first buffer memory (e.g., the first memory 261 in FIG. 2F). Each PE may be configured to compute, via the MAC circuitry, a dot product (e.g., a result of a dot product operation) of (i) each of the first number of sets of values stored in the first buffer memory and (ii) the second values stored in the second buffer memory (e.g., a second vector stored in the second memory 262 in FIG. 2F). Each PE may be configured to output the first number of computed dot products (e.g., S number of dot products in FIG. 2F) as outputs of convolution operations for the layer of the neural network.

In some embodiments, each PE may be configured to store a second number of sets of values (e.g., R number of second vectors in FIG. 2F) out of the plurality of second input values, in the second buffer memory (e.g., the second memory 262 in FIG. 2F). Each PE may be configured to compute, via the MAC circuitry, a dot product (e.g., a result of a dot product operation) of (i) the first values stored in the first buffer memory (e.g., a first vector stored in the first memory 261 in FIG. 2F) and (ii) each of the second number of sets of values stored in the second buffer memory. Each PE may be configured to output the second number of computed dot products (e.g., R number of dot products in FIG. 2F) as outputs of convolution operations for the layer of the neural network.

In some embodiments, the first plurality of input values may represent one of: input data streams (e.g., the input matrix 211 in FIG. 2A) and weights (e.g., the kernel matrix 212 in FIG. 2A) for the layer of the neural network. The second plurality of input values may represent the other of: input data streams and weights for the layer of the neural network.

FIG. 2I is a flow chart illustrating a process for generating a plurality of outputs for a layer of a neural network, according to an example implementation of the present disclosure. In some embodiments, the method includes receiving, by a processor, input data to generate a plurality of outputs for a layer of a neural network, the plurality of outputs being arranged in a first array (291). The method can include comparing dimensions of the first array with dimensions of a processing unit (PE) array comprising a plurality of PEs by the processor (292). The method can include partitioning, by the processor according to a result of the comparing, the first array into subarrays (293). Each of the subarrays may have dimensions less than or equal to the dimensions of the PE array. The method may include assigning, by the processor, a first group of PEs in the PE array to a first one of the subarrays (294). The method can include generating, by each PE of the first group of PEs assigned to the first one of the subarrays, a corresponding output of the plurality of outputs using a portion of the input data.

In further details of 291, and in some embodiments, a processor of an accelerator (e.g., the processor 124 in FIG. 1A), receives input data to generate a plurality of outputs for a layer of a neural network, the plurality of outputs being arranged in a first array. In some embodiments, the plurality of outputs may be outputs of convolution operations (see FIG. 2A) for the layer of the neural network. For example, referring to FIG. 2G, the first array may have a dimension of (M/2×2N).

In further details of 292, and in some embodiments, the processor compares dimensions of the first array with dimensions (e.g., (M×N) in FIG. 2B) of a processing unit (PE) array (e.g., the (M×N) PE array in FIG. 2B) including a plurality of PEs (e.g., PEs 222 in FIG. 2B). In some embodiments, the PE array may be a two-dimensional M×N array (see FIGS. 2B-2E and 2G-2H) and each of M and N may be an integer greater than 1. In some embodiments, the processor may be determined whether a size of the first array in a first dimension (e.g., 2N in (M/2×2N) array in FIG. 2G) is greater than a size of the PE array in the first dimension (e.g., N in (M×N) PE array in FIG. 2G).

In further details of 293, and in some embodiments, according to a result of the comparing, the processor may partition the first array into subarrays. In some embodiments, each of the subarrays may have dimensions less than or equal to the dimensions of the PE array. For example, in FIG. 2G, each of the first subarray and the second subarray has (M/2×N) dimensions which is less than or equal to dimensions of the PE array (i.e., M×N). In some embodiments, in response to determining that the size of the first array in the first dimension (e.g., 2N in (M/2×2N) array in FIG. 2G) is greater than the size of the PE array in the first dimension (e.g., N in (M×N) PE array in FIG. 2G), the processor may partition the first array into the first one and a second one of the subarrays (e.g., (M/2×2N) array is partitioned into two (M/2×N) subarrays in FIG. 2G).

In further details of 294, and in some embodiments, the processor may assign a first group of PEs (e.g., the (M/2×N) blocks 277 of PEs in FIG. 2G) in the PE array, to a first one of the subarrays (e.g., the (M/2×N) array in FIG. 2G). In some embodiments, the processor may assign the first subarray to the first group of PEs in the PE array, and the second subarray (e.g., the (M/2×N) array in FIG. 2G) to a second group of PEs (e.g., the (M/2×N) blocks 278 of PEs in FIG. 2G) in the PE array. Positions of the first group of PEs (e.g., the (M/2×N) blocks 277 of PEs in FIG. 2G) in a second dimension different from the first dimension may be different from positions of the second group of PEs (e.g., the (M/2×N) blocks 278 of PEs in FIG. 2G) in the second dimension.

In some embodiments, the processor may identify a common portion of the input data (e.g., the (M/2×K) input stream 273 in FIG. 2G) to be used by both the first and second groups of PEs. The processor may direct, route or shift a common portion of the input data (e.g., the (M/2×K)

input stream 273 in FIG. 2G), into the first and second groups of PEs (e.g., the (M/2×N) blocks 277 and the (M/2×N) blocks 278 in FIG. 2G).

In some embodiments, a processor may identify a first portion of the input data (e.g., the (K×N) operand data 274 in FIG. 2G) to be used by the first group of PEs (e.g., the (M/2×N) blocks 277 in FIG. 2G), and a second portion of the input data (e.g., the (K×N) operand data 275 in FIG. 2G) to be used by the second group of PEs (e.g., the (M/2×N) blocks 278 in FIG. 2G). The processor may direct, route or shift the first portion of the input data (e.g., the (K×N) operand data 274 in FIG. 2G), into the first group of PEs (e.g., the (M/2×N) blocks 277 in FIG. 2G). The processor may direct, route or shift the second portion of the input data (e.g., the (K×N) operand data 275 in FIG. 2G) into the second group of PEs (e.g., the (M/2×N) blocks 278 in FIG. 2G).

In further details of 295, each PE of the first group of PEs assigned to the first one of the subarrays (e.g., the (M/2×N) blocks 277 of PEs in FIG. 2G), may generate a corresponding output of the plurality of outputs using a portion of the input data (e.g., the (M/2×K) input stream 273 and the (K×N) operand data 274 in FIG. 2G). In some embodiments, the input data may include a first plurality of input values (e.g., the input matrix 211 in FIG. 2A) and a second plurality of input values (e.g., the kernel matrix 212 in FIG. 2A). In some embodiments, the first plurality of input values may represent one of input data streams (e.g., the input matrix 211 in FIG. 2A) and weights (e.g., the kernel matrix 212 in FIG. 2A) for the layer of the neural network. In some embodiments, the second plurality of input values may represent the other of input data streams and weights for the layer of the neural network. In generating the corresponding output of the plurality of outputs by each PE of the first group of PEs, each PE may receive first values (e.g., the first vector in FIG. 2F) of the first plurality of input values and second values (e.g., the second vector in FIG. 2F) of the second plurality of input values. Each PE may store the first values and the second values in a first buffer memory and a second buffer memory of said each PE (e.g., the first memory 261 and the second memory 262 in FIG. 2F), respectively. Multiplier and accumulator (MAC) circuitry of each PE (e.g., the MAC unit 140 in FIG. 1C) may generate or compute a first dot product of the first values and the second values (e.g., the dot product 263 in FIG. 2F).

In some embodiments, the first buffer memory of each PE (e.g., the first memory 261 in FIG. 2F) may store a first number of sets of values (e.g., S number of first vectors in FIG. 2F), out of the first plurality of input values. The MAC circuitry may compute a dot product of (i) each of the first number of sets of values stored in the first buffer memory of each PE and (ii) the second values stored in the second buffer memory of each PE (e.g., a second vector stored in the second memory 262 in FIG. 2F). The first number of computed dot products (e.g., S number of dot products in FIG. 2F) may be outputs of convolution operations for the layer of the neural network.

In some embodiments, the second buffer memory of each PE (e.g., the second memory 262 in FIG. 2F) may store a second number of sets of values (e.g., R number of second vectors in FIG. 2F), out of the plurality of second input values. The MAC circuitry may compute and output a dot product of (i) the first values stored in the first buffer memory of the said each PE (e.g., a first vector stored in the first memory 261 in FIG. 2F) and (ii) each of the second number of sets of values stored in the second buffer memory of each PE. The second number of computed dot products (e.g., R number of dot products in FIG. 2F) may be outputs of convolution operations for the layer of the neural network.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   receiving, by a processor, input data to generate a plurality of outputs for a layer of a neural network, the plurality of outputs being arranged in a first array;
   comparing, by the processor, dimensions of the first array with dimensions of a processing unit (PE) array comprising a plurality of PEs;
   partitioning, by the processor according to a result of the comparing, the first array into subarrays each having dimensions less than or equal to the dimensions of the PE array;
   assigning, by the processor, a first group of PEs in the PE array to a first one of the subarrays; and
   generating, by each PE of the first group of PEs assigned to the first one of the subarrays, a corresponding output of the plurality of outputs using a portion of the input data, wherein
   the input data includes a first plurality of vectors and a second plurality of vectors, and
   generating the corresponding output comprises
      storing a first vector, out of the first plurality of vectors, in a first buffer memory of said each PE, storing two or more vectors, out of the second plurality of vectors, in a second buffer memory of said each PE, generating, by multiplier and accumulator (MAC) circuitry of said each PE, a dot product of (i) the first vector stored in the first buffer memory of said each PE and (ii) each of the two or more vectors stored in the second buffer memory of said each PE, to generate a first plurality of dot products, storing a second vector, out of the first plurality of vectors, in the first buffer memory of said each PE, and generating, by the MAC circuitry of said each PE, a dot product of (i) the second vector stored in the first buffer memory of said each PE and (ii) each of the two or more vectors that is stored in the second buffer memory of said each PE and used to generate the first plurality of dot products, to generate a second plurality of dot products.

2. The method according to claim 1, wherein:
the PE array is a two-dimensional M×N array wherein each of M and N is an integer greater than 1, and
the partitioning of the first array comprises partitioning the first array into one or more of an M×N array, an M×N/2 array, an M/2×N array, or an M/2×N/2 array.

3. The method according to claim 1, further comprising:
determining whether a size of the first array in a first dimension is greater than a size of the PE array in the first dimension, wherein the first dimension is one of row or column; and
in response to determining that the size of the first array in the first dimension is greater than the size of the PE array in the first dimension:
partitioning the first array into the first one and a second one of the subarrays; and
assigning the first subarray to the first group of PEs in the PE array, and the second subarray to a second group of PEs in the PE array, wherein positions of the first group of PEs in a second dimension different from the first dimension are different from positions of the second group of PEs in the second dimension, wherein the second dimension is the other of row or column.

4. The method according to claim 3, further comprising:
identifying a common portion of the input data to be used by both the first and second groups of PEs; and
shifting the common portion of the input data into the first and second groups of PEs.

5. The method according to claim 3, further comprising:
identifying a first portion of the input data to be used by the first group of PEs, and a second portion of the input data to be used by the second group of PEs;
shifting the first portion of the input data into the first group of PEs; and
shifting the second portion of the input data into the second group of PEs.

6. The method according to claim 1, wherein the plurality of outputs are outputs of convolution operations for the layer of the neural network.

7. The method according to claim 1, further comprising:
outputting the first plurality of dot products as outputs of convolution operations for the layer of the neural network.

8. The method according to claim 1, wherein
the first plurality of vectors represent input data streams for the layer of the neural network, and
the second plurality of vectors represent weights for the layer of the neural network.

9. The method according to claim 1, wherein
the first plurality of vectors represent weights for the layer of the neural network, and
the second plurality of vectors represent input data streams for the layer of the neural network.

10. A device comprising:
a processor; and
a processing unit (PE) array comprising a plurality of PEs, wherein the processor is configured to:
receive input data to generate a plurality of outputs for a layer of a neural network, the plurality of outputs being arranged in a first array;
compare dimensions of the first array with dimensions of the PE array;
partition, according to a result of the comparing, the first array into subarrays each having dimensions less than or equal to the dimensions of the PE array; and
assign a first group of PEs in the PE array, to a first one of the subarrays, wherein
each PE of the first group of PEs assigned to the first one of the subarrays, is configured to generate a corresponding output of the plurality of outputs using a portion of the input data,
said each PE includes a first buffer memory, a second buffer memory, and multiplier and accumulator (MAC) circuitry,
the input data includes a first plurality of vectors and a second plurality of vectors, and
said each PE is configured to
store a first vector, out of the first plurality of vectors, in the first buffer memory,
store two or more vectors, out of the second plurality of vectors, in the second buffer memory of said each PE,
generate, by the MAC circuitry, a dot product of (i) the first vector stored in the first buffer memory of said each PE and (ii) each of the two or more vectors stored in the second buffer memory of said each PE, to generate a first plurality of dot products,
store a second vector, out of the first plurality of vectors, in the first buffer memory of said each PE, and
generate, by the MAC circuitry, a dot product of (i) the second vector stored in the first buffer memory of said each PE and (ii) each of the two or more vectors that is stored in the second buffer memory of said each PE and used to generate the first plurality of dot products, to generate a second plurality of dot products.

11. The device according to claim 10, wherein:
the PE array is a two-dimensional M×N array, wherein each of M and N is an integer greater than 1, and
the processor is configured to partition the first array into one or more of an M×N array, an M×N/2 array, an M/2×N array, or an M/2×N/2 array.

12. The device according to claim 1, wherein:
the processor is configured to determine whether a size of the first array in a first dimension is greater than a size of the PE array in the first dimension, wherein the first dimension is one of row or column,
in response to determining that the size of the first array in the first dimension is greater than the size of the PE array in the first dimension, the processor is configured to:

partition the first array into the first one and a second one of the subarrays; and assign the first subarray to the first group of PEs in the PE array and assign the second subarray to a second group of PEs in the PE array, wherein positions of the first group of PEs in a second dimension different from the first dimension are different from positions of the second group of PEs in the second dimension, wherein the second dimension is the other of row or column.

13. The device according to claim 12, wherein the processor is further configured to:

identify a common portion of the input data to be used by both the first and second groups of PEs; and shift the common portion of the input data into the first and second groups of PEs.

14. The device according to claim 12, wherein the processor is further configured to:

identify a first portion of the input data to be used by the first group of PEs and a second portion of the input data to be used by the second group of PEs;

shift the first portion of the input data into the first group of PEs; and shift the second portion of the input data into the second group of PEs.

15. The device according to claim 10, wherein the plurality of outputs are outputs of convolution operations for the layer of a neural network.

16. The device according to claim 10, wherein said each PE is configured to output the first plurality of dot products as outputs of convolution operations for the layer of the neural network.

17. The device according to claim 10, wherein:

the first plurality of vectors represent input data streams for the layer of the neural network, and the second plurality of vectors represent weights for the layer of the neural network.

18. The device according to claim 10, wherein the first plurality of vectors represent weights for the layer of the neural network, and the second plurality of vectors represent input data streams for the layer of the neural network.

* * * * *